(12) United States Patent
Shi et al.

(10) Patent No.: US 11,879,986 B2
(45) Date of Patent: Jan. 23, 2024

(54) THREE-DIMENSIONAL CO-PRIME CUBIC ARRAY DIRECTION-OF-ARRIVAL ESTIMATION METHOD BASED ON A CROSS-CORRELATION TENSOR

(71) Applicant: Zhejiang University, Zhejiang (CN)

(72) Inventors: Zhiguo Shi, Zhejiang (CN); Hang Zheng, Zhejiang (CN); Chengwei Zhou, Zhejiang (CN); Jiming Chen, Zhejiang (CN); Yong Wang, Zhejiang (CN)

(73) Assignee: Zhejiang University, Zhejiang (CN)

( * ) Notice: Subject to any disclaimer, the term of this patent is extended or adjusted under 35 U.S.C. 154(b) by 254 days.

(21) Appl. No.: 17/623,607

(22) PCT Filed: Jan. 20, 2021

(86) PCT No.: PCT/CN2021/072779
§ 371 (c)(1),
(2) Date: Dec. 29, 2021

(87) PCT Pub. No.: WO2022/151511
PCT Pub. Date: Jul. 21, 2022

(65) Prior Publication Data
US 2023/0055481 A1 Feb. 23, 2023

(30) Foreign Application Priority Data

Jan. 18, 2021 (CN) .......................... 202110065604.4

(51) Int. Cl.
*G01S 3/14* (2006.01)
(52) U.S. Cl.
CPC .................................... *G01S 3/143* (2013.01)
(58) Field of Classification Search
CPC ... G01S 3/143; G01S 3/74; G01S 3/46; G01S 7/4915; G01S 7/894; G01S 17/32

(Continued)

(56) References Cited

U.S. PATENT DOCUMENTS

| | | | | |
|---|---|---|---|---|
| 10,853,590 | B2* | 12/2020 | Gomez | G06F 40/263 |
| 11,803,711 | B2* | 10/2023 | Gomez | G06N 3/08 |
| 2021/0364564 | A1* | 11/2021 | Chen | G06F 18/211 |

FOREIGN PATENT DOCUMENTS

| | | |
|---|---|---|
| CN | 109932680 | 6/2019 |
| CN | 111610486 | 9/2020 |

(Continued)

OTHER PUBLICATIONS

Zhou Chengwei et al., "Research Progress on Coprime Array Signal Processing: Direction-of-Arrival Estimation and Adaptive Beamforming", Journal of Radars, with English abstract, Oct. 31, 2019, pp. 558-577.

(Continued)

*Primary Examiner* — Bo Fan
(74) *Attorney, Agent, or Firm* — JCIP GLOBAL INC.

(57) ABSTRACT

The present disclosure discloses a three-dimensional co-prime cubic array direction-of-arrival estimation method based on a cross-correlation tensor, mainly solving the problems of multi-dimensional signal structured information loss and Nyquist mismatch in existing methods and comprising the following implementing steps: constructing a three-dimensional co-prime cubic array; carrying out tensor modeling on a receiving signal of the three-dimensional co-prime cubic array; calculating six-dimensional second-order cross-correlation tensor statistics; deducing a three-dimensional virtual uniform cubic array equivalent signal tensor based on cross-correlation tensor dimension merging transformation; constructing a four-dimensional virtual domain signal tensor based on mirror image augmentation of the three-dimensional virtual uniform cubic array; constructing a signal and noise subspace in a Kronecker product form through virtual domain signal tensor decomposition; and (Continued)

acquiring a direction-of-arrival estimation result based on three-dimensional spatial spectrum search.

6 Claims, 3 Drawing Sheets

(58) Field of Classification Search
USPC ... 342/109, 159, 195, 357.52, 396, 417, 445
See application file for complete search history.

(56) References Cited

FOREIGN PATENT DOCUMENTS

| | | |
|---|---|---|
| CN | 111624545 | 9/2020 |
| CN | 112162240 | 1/2021 |

OTHER PUBLICATIONS

Chengwei Zhou et al., "Direction-of-Arrival Estimation for Coprime Array via Virtual Array Interpolation", IEEE Transactions on Signal Processing, Nov. 15, 2018, pp. 5956-5971.

"International Search Report (Form PCT/ISA/210) of PCT/CN2021/072779," dated Oct. 15, 2021, pp. 1-5.

"Written Opinion of the International Searching Authority (Form PCT/ISA/237) of PCT/CN2021/072779," dated Oct. 15, 2021, pp. 1-5.

* cited by examiner

THREE-DIMENSIONAL CO-PRIME CUBIC ARRAY DIRECTION-OF-ARRIVAL ESTIMATION METHOD BASED ON A CROSS-CORRELATION TENSOR

CROSS-REFERENCE TO RELATED APPLICATION

This application is a 371 of international application of PCT application Ser. No. PCT/CN2021/072779, filed on Jan. 20, 2021, which claims the priority benefit of China application no. 202110065604.4, filed on Jan. 18, 2021. The entirety of each of the above mentioned patent applications is hereby incorporated by reference herein and made a part of this specification.

TECHNICAL FIELD

The present disclosure belongs to the technical field of array signal processing, particularly relates to a statistic signal processing technology of a multi-dimensional space sparse array virtual domain statistics, and more particularly relates to a three-dimensional co-prime cubic array direction-of-arrival estimation method based on a cross-correlation tensor, which can be used for target positioning.

BACKGROUND

As a typical systematic sparse array architecture, a co-prime array has the advantages of large apertures and high resolution, and can break through the bottleneck of traditional uniform array direction-of-arrival estimation in an aspect of performance. As array element sparse arrangement of the co-prime array cannot meet the requirement of a Nyquist sampling rate, in order to realize Nyquist matched direction-of-arrival estimation, it is often to deduct a co-prime array receiving signal to a second-order statistics model to construct an augmented virtual uniform array and extract angle information by use of its corresponding virtual domain equivalent signal. To meet requirements of such fields as radar detection, 5G communication and medical imaging on three-dimensional space target direction finding accuracy, a three-dimensional co-prime cubic array with a larger stereo aperture and its corresponding virtual domain signal processing have attracted extensive attention. In the traditional direction-of-arrival estimation method oriented to co-prime linear arrays and co-prime planar arrays, it is often to overlap receiving signals into vectors for processing, deduce a linear virtual domain equivalent signal by vectorized second-order autocorrelation statistics, and introduce spatial smoothing to resolve an identifiable problem of a signal source so as to realize Nyquist matched direction-of-arrival estimation. However, when this vectorized signal processing method is simply expanded to a three-dimensional co-prime cubic array scene, not only is an original spatial information structure of a multi-dimensional receiving signal destroyed, but also the virtual domain signal model deduced by the vectorized signal has the problems of larger linear scale, aliasing and mismatch of multi-dimensional spatial information and the like.

A tensor is a multi-dimensional data type and can be used for storing complicated multi-dimensional signal information. Methods including multi-dimensional signal characteristic analysis, high-order singular value decomposition, tensor decomposition and the like provide rich mathematic tools for tensor-oriented signal processing. In recent years, a tensor model has been widely used in array signal processing, image signal processing, statistics and other fields. Therefore, by using a tensor to construct a three-dimensional co-prime cubic array receiving signal, the original structure information of the multi-dimensional receiving signal can be effectively retained, a Nyquist matched virtual domain signal processing technology is promoted in a tensor space so as to provide an important theoretical tool for improving performance of direction-of-arrival estimation. Whereas the existing tensor method has not yet involved in signal processing oriented to three-dimensional co-prime cubic array virtual domain statistics, and it still adopts a traditional autocorrelation statistics-based calculation method, which is incapable of effectively matching a traditional linear virtual domain deduction means into a three-dimensional co-prime cubic array scene. Hence, how to design a multi-dimensional virtual domain model based on statistics characteristic analysis of the three-dimensional co-prime cubic array receiving signal tensor so as to realize Nyquist matched direction-of-arrival estimation, becomes a key problem that needs to be urgently resolved at current.

SUMMARY

In view of the problems of multi-dimensional signal structured information loss and Nyquist mismatch in existing methods, an object of the present disclosure is to provide a three-dimensional co-prime cubic array direction-of-arrival estimation method based on a cross-correlation tensor so as to provide a feasible thought and an effective solution for establishing relevance between a three-dimensional co-prime cubic array multi-dimensional virtual domain and cross-correlation tensor statistics, and realizing Nyquist matched direction-of-arrival estimation by means of structured information of the cross-correlation virtual domain signal tensor.

The object of the present disclosure is realized by adopting the following technical solution: a three-dimensional co-prime cubic array direction-of-arrival estimation method based on a cross-correlation tensor, comprises the following steps:

(1) constructing at a receiving end with $M_x^{(\mathbb{Q}_1)} M_y^{(\mathbb{Q}_1)} M_z^{(\mathbb{Q}_1)} + M_x^{(\mathbb{Q}_2)} M_y^{(\mathbb{Q}_2)} M_z^{(\mathbb{Q}_2)} - 1$ physical antenna array elements in accordance with a structure of a three-dimensional co-prime cubic array, wherein $M_x^{(\mathbb{Q}_1)}$ and $M_x^{(\mathbb{Q}_2)}$, $M_y^{(\mathbb{Q}_1)}$ and $M_y^{(\mathbb{Q}_2)}$, and $M_z^{(\mathbb{Q}_1)}$ and $M_z^{(\mathbb{Q}_2)}$ are respectively a pair of co-prime integers, and the three-dimensional co-prime cubic array is decomposable into two sparse and uniform cubic subarrays $\mathbb{Q}_1$ and $\mathbb{Q}_2$;

(2) supposing there are K far-field narrowband non-coherent signal sources from a direction of $\{(\theta_1, \varphi_1), (\theta_2, \varphi_2), \ldots, (\theta_K, \varphi_K)\}$, carrying out modeling on a receiving signal of the sparse and uniform cubic subarray $\mathbb{Q}_i$ of the three-dimensional co-prime cubic array via a four-dimensional tensor $\mathcal{X}_{\mathbb{Q}_i} \in \mathbb{C}^{M_x^{(\mathbb{Q}_i)} \times M_y^{(\mathbb{Q}_i)} \times M_z^{(\mathbb{Q}_i)} \times T}$ (T is a number of sampling snapshots) as follows:

$$\mathcal{X}_{\mathbb{Q}_i} = \sum_{k=1}^{K} a_x^{(\mathbb{Q}_i)}(\mu_k) \circ a_y^{(\mathbb{Q}_i)}(\nu_k) \circ a_z^{(\mathbb{Q}_i)}(\omega_k) \circ s_k + \mathcal{N}_{\mathbb{Q}_i}$$

wherein, $s_k = [s_{k,1}, s_{k,2}, \ldots, s_{k,T}]^T$ is a multi-snapshot sampling signal waveform corresponding to a $k^{th}$ incident signal source, $(\bullet)^T$ represents a transposition operation, $\circ$ represents an external product of vectors, $\mathcal{N}_{\mathbb{Q}_i} \in \mathbb{C}^{M_x^{(\mathbb{Q}_i)} \times M_y^{(\mathbb{Q}_i)} \times M_z^{(\mathbb{Q}_i)} \times T}$ is a noise tensor mutually independent from each signal source, $a_x^{(\mathbb{Q}_i)}(\mu_k)$, $a_y^{(\mathbb{Q}_i)}(\nu_k)$ and $a_z^{(\mathbb{Q}_i)}(\omega_k)$ are steering vectors of the three-dimensional sparse and uniform cubic subarray $\mathbb{Q}_i$ in the directions of an x axis, a y axis and a z axis respectively, and a signal source corresponding to a direction-of-arrival of $(\theta_k,\varphi_k)$ is represented as:

$$a_x^{(\mathbb{Q}_i)}(\mu_k) = \left[1, e^{-j\pi x_{\mathbb{Q}_i}^{(2)}\mu_k}, \ldots, e^{-j\pi x_{\mathbb{Q}_i}^{(M_x^{(\mathbb{Q}_i)})}\mu_k}\right]^T, \quad (2)$$

$$a_y^{(\mathbb{Q}_i)}(v_k) = \left[1, e^{-j\pi y_{\mathbb{Q}_i}^{(2)}v_k}, \ldots, e^{-j\pi y_{\mathbb{Q}_i}^{(M_y^{(\mathbb{Q}_i)})}v_k}\right]^T,$$

$$a_z^{(\mathbb{Q}_i)}(\omega_k) = \left[1, e^{-j\pi z_{\mathbb{Q}_i}^{(2)}\omega_k}, \ldots, e^{-j\pi z_{\mathbb{Q}_i}^{(M_z^{(\mathbb{Q}_i)})}\omega_k}\right]^T,$$

wherein, $x_{\mathbb{Q}_i}^{(i_1)}(i_1=1,2,\ldots,M_x^{(\mathbb{Q}_i)})$, $y_{\mathbb{Q}_i}^{(i_2)}(i_2=1,2,\ldots,M_y^{(\mathbb{Q}_i)})$ and $z_{\mathbb{Q}_i}^{(i_3)}(i_3=1,2,\ldots,M_z^{(\mathbb{Q}_i)})$ respectively represent actual locations of $\mathbb{Q}_i$ in $i_1^{th}$, $i_2^{th}$ and $i_3^{th}$ physical antenna array elements in the directions of the x axis, the y axis and the z axis, and $x_{\mathbb{Q}_i}^{(1)} = y_{\mathbb{Q}_i}^{(1)} = z_{\mathbb{Q}_i}^{(1)} = 0$, $\mu_k = \sin(\varphi_k)\cos(\theta_k)$, $v_k = \sin(\varphi_k)\sin(\theta_k)$, $\omega_k = \cos(\varphi_k)$, $j = \sqrt{-1}$;

(3) based on four-dimensional receiving signal tensors $\mathcal{X}_{\mathbb{Q}_1}$ and $\mathcal{X}_{\mathbb{Q}_2}$ of the two three-dimensional sparse and uniform cubic subarrays $\mathbb{Q}_1$ and $\mathbb{Q}_2$, solving their cross-correlation statistics to obtain a six-dimensional space information-covered second-order cross-correlation tensor $\mathcal{R}_{\mathbb{Q}_1\mathbb{Q}_2} \in \mathbb{C}^{M_x^{(\mathbb{Q}_1)} \times M_y^{(\mathbb{Q}_1)} \times M_z^{(\mathbb{Q}_1)} \times M_x^{(\mathbb{Q}_2)} \times M_y^{(\mathbb{Q}_2)} \times M_z^{(\mathbb{Q}_2)}}$:

$$\mathcal{R}_{\mathbb{Q}_1\mathbb{Q}_2} = E[\langle \mathcal{X}_{\mathbb{Q}_1}, \mathcal{X}_{\mathbb{Q}_2}^* \rangle_4] =$$

$$\sum_{k=1}^{K} \sigma_k^2 a_x^{(\mathbb{Q}_1)}(\mu_k) \circ a_y^{(\mathbb{Q}_1)}(v_k) \circ a_z^{(\mathbb{Q}_1)}(\omega_k) \circ a_x^{(\mathbb{Q}_2)^*}(\mu_k) \circ a_y^{(\mathbb{Q}_2)^*}(v_k) \circ a_z^{(\mathbb{Q}_2)^*}(\omega_k) + \mathcal{N}_{\mathbb{Q}_1\mathbb{Q}_2},$$

wherein, $\sigma_k^2 = E[s_k s_k^*]$ represents a power of a $k^{th}$ incident signal source, $\mathcal{N}_{\mathbb{Q}_1\mathbb{Q}_2} = E[\langle \mathcal{N}_{\mathbb{Q}_1}, \mathcal{N}_{\mathbb{Q}_2}^* \rangle_4]$ represents a six-dimensional cross-correlation noise tensor, $\langle \bullet, \bullet \rangle_r$ represents a tensor contraction operation of two tensors along a $r^{th}$ dimension, $E[\bullet]$ represents an operation of taking a mathematic expectation, and $(\bullet)^*$ represents a conjugate operation. A six-dimensional tensor $\mathcal{N}_{\mathbb{Q}_1\mathbb{Q}_2}$ merely has an element with a value of $\sigma_n^2$ in a $(1,1,1,1,1,1)^{th}$ location, $\sigma_n^2$ representing a noise power, and with a value of 0 in other locations;

(4) as a first dimension and a fourth dimension (represented by steering vectors $a_x^{(\mathbb{Q}_1)}(\mu_k)$ and $a_x^{(\mathbb{Q}_2)^*}(\mu_k)$) of the cross-correlation tensor $\mathcal{R}_{\mathbb{Q}_1\mathbb{Q}_2}$ represent space information in the direction of the x axis, a second dimension and a fifth dimension (represented by steering vectors $a_y^{(\mathbb{Q}_1)}(v_k)$ and $a_y^{(\mathbb{Q}_2)^*}(v_k)$) represent space information in the direction of the y axis, and a third dimension and a sixth dimension (represented by steering vectors $a_z^{(\mathbb{Q}_1)}(\omega_k)$ and $a_z^{(\mathbb{Q}_2)^*}(\omega_k)$) represent space information in the direction of the z axis, defining dimension sets $\mathbb{J}_1 = \{1,4\}$ $\mathbb{J}_2 = \{2,5\}$ and $\mathbb{J}_3 = \{3,6\}$, and carrying out tensor transformation of dimension merging on the cross-correlation tensor $\mathcal{R}_{\mathbb{Q}_1\mathbb{Q}_2}$ to obtain a virtual domain second-order equivalent signal tensor $\mathcal{U}_\mathbb{W} \in \mathbb{C}^{M_x^{(\mathbb{Q}_1)} M_x^{(\mathbb{Q}_2)} \times M_y^{(\mathbb{Q}_1)} M_y^{(\mathbb{Q}_2)} \times M_z^{(\mathbb{Q}_1)} M_z^{(\mathbb{Q}_2)}}$:

$$\mathcal{U}_\mathbb{W} \triangleq \mathcal{R}_{\mathbb{Q}_1\mathbb{Q}_2\{\mathbb{J}_1,\mathbb{J}_2,\mathbb{J}_3\}} = \sum_{k=1}^{K} \sigma_k^2 b_x(\mu_k) \circ b_y(v_k) \circ b_z(\omega_k),$$

wherein, $b_x(\mu_k) = a_x^{(\mathbb{Q}_2)^*}(\mu_k) \otimes a_x^{(\mathbb{Q}_1)}(\mu_k)$, $b_y(v_k) = a_y^{(\mathbb{Q}_2)^*}(v_k) \otimes a_y^{(\mathbb{Q}_1)}(v_k)$ and $b_z(\omega_k) = a_z^{(\mathbb{Q}_2)^*}(\omega_k) \otimes a_z^{(\mathbb{Q}_1)}(\omega_k)$ respectively construct augmented virtual arrays in the directions of the x axis, the y axis and the z axis through forming arrays of difference sets on exponential terms, $b_x(\mu_k)$, $b_y(v_k)$ and $b_z(\omega_k)$ are respectively equivalent to steering vectors of the virtual arrays in the x axis, the y axis and the z axis to correspond to signal sources in a direction-of-arrival of $(\theta_k,\varphi_k)$, and $\otimes$ represents a product of Kronecker. Therefore, $\mathcal{U}_\mathbb{W}$ corresponds to an augmented three-dimensional virtual non-uniform cubic array $\mathbb{W}$; to simplify a deduction process, the six-dimensional noise tensor $\mathcal{N}_{\mathbb{Q}_1\mathbb{Q}_2}$ is omitted in a theoretical modeling step about $\mathcal{U}_\mathbb{W}$;

$\overline{\mathbb{W}}$ comprises a three-dimensional uniform cubic array $\overline{\mathbb{W}}$ with $(3M_x^{(\mathbb{Q}_1)} - M_x^{(\mathbb{Q}_2)} + 1) \times (3M_y^{(\mathbb{Q}_1)} - M_y^{(\mathbb{Q}_2)} + 1) \times (3M_z^{(\mathbb{Q}_1)} - M_z^{(\mathbb{Q}_2)} + 1)$ virtual array elements, represented as:

$$\overline{\mathbb{W}} = \{(x,y,z) | x = p_x d, y = p_y d, z = p_z d, -M_x^{(\mathbb{Q}_1)} \leq p_x \leq -M_x^{(\mathbb{Q}_2)} + 2M_x^{(\mathbb{Q}_1)}, -M_y^{(\mathbb{Q}_1)} \leq p_y \leq -M_y^{(\mathbb{Q}_2)} + 2M_y^{(\mathbb{Q}_1)}, -M_z^{(\mathbb{Q}_1)} \leq p_z \leq -M_z^{(\mathbb{Q}_2)} + 2M_z^{(\mathbb{Q}_1)}\};$$

the equivalent signal tensor $\overline{\mathcal{U}}_{\overline{\mathbb{W}}} \in \mathbb{C}^{(3M_x^{(\mathbb{Q}_1)} - M_x^{(\mathbb{Q}_2)} + 1) \times (3M_y^{(\mathbb{Q}_1)} - M_y^{(\mathbb{Q}_2)} + 1) \times (3M_z^{(\mathbb{Q}_1)} - M_z^{(\mathbb{Q}_2)} + 1)}$ of the three-dimensional uniform cubic array $\overline{\mathbb{W}}$ is modeled as:

$$\overline{\mathcal{U}}_{\overline{\mathbb{W}}} = \sum_{k=1}^{K} \sigma_k^2 \overline{b}_x(\mu_k) \circ \overline{b}_y(v_k) \circ \overline{b}_z(\omega_k),$$

wherein, $$\overline{b}_x(\mu_k) = \left[e^{-j\pi(-M_x^{(\mathbb{Q}_1)})\mu_k}, e^{-j\pi(-M_x^{(\mathbb{Q}_1)}+1)\mu_k}, \ldots, e^{-j\pi(-M_x^{(\mathbb{Q}_2)}+2M_x^{(\mathbb{Q}_1)})\mu_k}\right]^T \in \mathbb{C}^{3M_x^{(\mathbb{Q}_1)} - M_x^{(\mathbb{Q}_2)} + 1},$$

$$\overline{b}_y(v_k) = \left[e^{-j\pi(-M_y^{(\mathbb{Q}_1)})v_k}, e^{-j\pi(-M_y^{(\mathbb{Q}_1)}+1)v_k}, \ldots, e^{-j\pi(-M_y^{(\mathbb{Q}_2)}+2M_y^{(\mathbb{Q}_1)})v_k}\right]^T \in \mathbb{C}^{3M_y^{(\mathbb{Q}_1)} - M_y^{(\mathbb{Q}_2)} + 1}$$

and $$\overline{b}_z(\omega_k) = \left[e^{-j\pi(-M_z^{(\mathbb{Q}_1)})\omega_k}, e^{-j\pi(-M_z^{(\mathbb{Q}_1)}+1)\omega_k}, \ldots, e^{-j\pi(-M_z^{(\mathbb{Q}_2)}+2M_z^{(\mathbb{Q}_1)})\omega_k}\right]^T \in \mathbb{C}^{3M_z^{(\mathbb{Q}_1)} - M_z^{(\mathbb{Q}_2)} + 1}$$

respectively represent steering vectors of the three-dimensional virtual uniform cubic array $\overline{\mathbb{W}}$ in the x axis, the y axis and the z axis corresponding to signal sources in the direction-of-arrival of $(\theta_k,\varphi_k)$;

(5) as a mirror image portion $\overline{\mathbb{W}}_{sym}$ of the three-dimensional virtual uniform cubic array $\overline{\mathbb{W}}$ is represented as:

$$\overline{\mathbb{W}}_{sym} = \{(x,y,z) | x = \check{p}_x d, y = \check{p}_y d, z = \check{p}_z d, M_x^{(\mathbb{Q}_2)} - 2M_x^{(\mathbb{Q}_1)} \leq \check{p}_x \leq M_x^{(\mathbb{Q}_1)}, M_y^{(\mathbb{Q}_2)} - 2M_y^{(\mathbb{Q}_1)} \leq \check{p}_y \leq M_y^{(\mathbb{Q}_1)}, M_z^{(\mathbb{Q}_2)} - 2M_z^{(\mathbb{Q}_1)} \leq \check{p}_z \leq M_z^{(\mathbb{Q}_1)}\};$$

carrying out transformation by using the equivalent signal tensor $\overline{\mathcal{U}}_{\overline{\mathbb{W}}}$ of the three-dimensional virtual uniform cubic array $\overline{\mathbb{W}}$ to obtain an equivalent signal tensor $\overline{\mathcal{U}}_{\overline{\mathbb{W}}\,sym} \in \mathbb{C}^{(3M_x^{(\mathbb{Q}_1)} - M_x^{(\mathbb{Q}_2)} + 1) \times (3M_y^{(\mathbb{Q}_1)} - M_y^{(\mathbb{Q}_2)} + 1) \times (3M_z^{(\mathbb{Q}_1)} - M_z^{(\mathbb{Q}_2)} + 1)}$ of a three-dimensional mirror image virtual uniform cubic array $\overline{\mathbb{W}}_{sym}$, specifically comprising: carrying out a conjugate operation on the three-dimensional virtual domain signal tensor $\overline{u}_{\overline{w}}$ to obtain $\overline{u}_{\overline{w}}^*$, carrying out position reversal on elements in the $\overline{u}_{\overline{w}}^*$ along directions of three dimensions successively so as to obtain the equivalent signal tensor $\overline{u}_{\overline{w}\ sym}$ corresponding to the $\overline{\mathbb{W}}_{sym}$;

superposing the equivalent signal tensor $\overline{u}_{\overline{w}}$ of the three-dimensional virtual uniform cubic array $\overline{w}$ and the equivalent signal tensor $\overline{u}_{\overline{w}\ sym}$ of the mirror image virtual uniform cubic array $\overline{w}_{sym}$ in the fourth dimension (i.e., a dimension representing mirror image transformation information) to obtain a four-dimensional virtual domain signal tensor $\mathcal{G} \in \mathbb{C}^{(M_x^{(Q_2)} - M_x^{(Q_1)} + 1) \times (3M_y^{(Q_1)} - M_y^{(Q_2)} + 1) \times (1M_z^{(Q_1)} - M_z^{(Q_2)} + 1) \times 2}$, modeled as:

$$\mathcal{G} = \Sigma_{k=1}^{K} \sigma_k^2 \overline{b}_x(\mu_k) \circ \overline{b}_y(\nu_k) \circ \overline{b}_z(\omega_k) \circ c(\mu_k, \nu_k, \omega_k),$$

wherein, $$c(\mu_k, \nu_k, \omega_k) = \left[1, e^{-j\pi\left((M_x^{(Q_2)} - M_x^{(Q_1)})\mu_k + (M_y^{(Q_2)} - M_y^{(Q_1)})\nu_k + (M_z^{(Q_2)} - M_z^{(Q_1)})\omega_k\right)}\right]^T$$

is a three-dimensional space mirror image transformation factor vector;

(6) carrying out CANDECOMP/PARACFAC decomposition on the four-dimensional virtual domain signal tensor $\mathcal{G}$ to obtain factor vectors $\overline{b}_x(\mu_k)$, $\overline{b}_y(\nu_k)$, $\overline{b}_z(\omega_k)$ and $c(\mu_k, \nu_k, \omega_k)$, $k=1, 2, \ldots, K$, corresponding to four-dimensional space information, and constructing a signal subspace $V_s \in \mathbb{C}^{V \times K}$ through a form of their Kronecker products:

$V_s = \text{orth}([\overline{b}_x(\mu_1) \otimes \overline{b}_y(\nu_1) \otimes \overline{b}_z(\omega_1) \otimes c(\mu_1, \nu_1, \omega_1),$
$\overline{b}_x(\mu_2) \otimes \overline{b}_y(\nu_2) \otimes \overline{b}_z(\omega_2) \otimes c(\mu_2, \nu_2, \omega_2), \ldots,$
$\overline{b}_x(\mu_K) \otimes \overline{b}_y(\nu_K) \otimes \overline{b}_z(\omega_K) \otimes c(\mu_K, \nu_K, \omega_K)]),$ wherein, $\text{orth}(\bullet)$ represents a matrix orthogonalization operation, $V = 2(3M_x^{(Q_1)} - M_x^{(Q_2)} + 1)(3M_y^{(Q_1)} - M_y^{(Q_2)} + 1)(3M_z^{(Q_1)} - M_z^{(Q_2)} + 1)$; by using $V_n \in \mathbb{C}^{V \times (V-K)}$ to represent a noise subspace, $V_n V_n^H$ is obtained by $V_s$:

$$V_n V_n^H = I - V_s V_s^H,$$

wherein, I represents a unit matrix; $(\bullet)^H$ represents a conjugate transposition operation; and (7) traversing a two-dimensional direction-of-arrival of $(\tilde{\theta}, \tilde{\varphi})$, calculating corresponding parameters $\tilde{\nu}_k = \sin(\tilde{\varphi}_k)\cos(\tilde{\theta}_k)$, $\tilde{\nu}_k = \sin(\tilde{\varphi}_k)\sin(\tilde{\theta}_k)$ and $\tilde{\omega}_k = \cos(\tilde{\varphi}_k)$, and constructing a steering vector $\tilde{v}(\tilde{\mu}_k, \tilde{\nu}_k, \tilde{\omega}_k) \in \mathbb{C}^V$ corresponding to the three-dimensional virtual uniform cubic array $\overline{\mathbb{W}}$, represented as:

$\tilde{v}(\tilde{\mu}_k, \tilde{\nu}_k, \tilde{\omega}_k) = \overline{b}_x(\tilde{\mu}_k) \otimes \overline{b}_y(\tilde{\nu}_k) \otimes \overline{b}_z(\tilde{\omega}_k) \otimes c(\tilde{\mu}_k, \tilde{\nu}_k, \tilde{\omega}_k),$ wherein, $\tilde{\theta} \in [-90°, 90°]$, $\tilde{\varphi} \in [0°, 180°]$. A three-dimensional spatial spectrum $\mathcal{P}(\tilde{\theta}, \tilde{\varphi})$ is calculated as follows:

$\mathcal{P}(\tilde{\theta}, \tilde{\varphi}) = 1/(\tilde{v}^H(\tilde{\mu}_k, \tilde{\nu}_k, \tilde{\omega}_k)(V_n V_n^H)\tilde{v}(\tilde{\mu}_k, \tilde{\nu}_k, \tilde{\omega}_k)).$ Spectral peak search is carried out on the three-dimensional spatial spectrum $\mathcal{P}(\tilde{\theta}, \tilde{\varphi})$ to obtain a direction-of-arrival estimation result.

Further, the structure of the three-dimensional co-prime cubic array in step (1) is specifically described as: a pair of three-dimensional sparse and uniform cubic subarrays $\mathbb{Q}_1$ and $\mathbb{Q}_2$ are constructed in a rectangular coordinate system, wherein $\mathbb{Q}_1$ comprises $M_x^{(Q_1)} \times M_y^{(Q_1)} \times M_z^{(Q_1)}$ antenna array elements, with array element spacings in the directions of the x axis, the y axis and the z axis being $M_x^{(Q_2)}d$, $M_y^{(Q_2)}d$ and $M_z^{(Q_2)}d$ respectively, with locations in the rectangular coordinate system being $\{(M_x^{(Q_2)}dm_{1x},$ $M_y^{(Q_2)}dm_{1y}, M_z^{(Q_2)}dm_{1z}), m_{1x}=0,1,\ldots, M_x^{(Q_1)}-1,$ $m_{1y}=0,1,\ldots, M_y^{(Q_1)}-1, m_{1z}=0,1,\ldots, M_z^{(Q_1)}-1\}$; $\mathbb{Q}_2$ comprises $M_x^{(Q_2)} \times M_y^{(Q_2)} \times M_z^{(Q_2)}$ antenna array elements, with array element spacings in the directions of the x axis, the y axis and the z axis being $M_x^{(Q_1)}d$, $M_y^{(Q_1)}d$ and $M_z^{(Q_1)}d$ respectively, with locations in the rectangular coordinate system being $\{(M_x^{(Q_1)}dm_{2x},$ $M_y^{(Q_1)}dm_{2y}, M_z^{(Q_1)}dm_{2z}), m_{2x}=0,1,\ldots, M_x^{(Q_2)}-1,$ $m_{2y}=0,1,\ldots, M_y^{(Q_2)}-1, m_{2z}=0,1,\ldots, M_z^{(Q_2)}-1\}$; a unit spacing d has a value half of an incident narrowband signal wavelength $\lambda$, i.e., $d=\lambda/2$ subarray combination is carried out on the $\mathbb{Q}_1$ and $\mathbb{Q}_2$ in such a way that array elements on the (0,0,0) location in the rectangular coordinate system are overlapped so as to obtain a three-dimensional co-prime cubic array actually containing $M_x^{(Q_1)} M_y^{(Q_1)} M_z^{(Q_1)} + M_x^{(Q_2)} M_y^{(Q_2)} M_z^{(Q_2)} - 1$ physical antenna array elements.

Further, the second-order cross-correlation tensor statistics of the three-dimensional co-prime cubic array in step (3) are estimated by calculating cross-correlation statistics of T sampling snapshots of the receiving signal tensors $\mathcal{X}_{\mathbb{Q}_1}(t)$ and $\mathcal{X}_{\mathbb{Q}_2}(t)$ in reality:

$$\hat{R}_{\mathbb{Q}_1 \mathbb{Q}_2} = \frac{1}{T}\sum_{t=1}^{T} \mathcal{X}_{\mathbb{Q}_1}(t) \circ \mathcal{X}_{\mathbb{Q}_2}^*(t).$$

Further, the equivalent signal tensor $\overline{u}_{\overline{\mathbb{W}}}$ of the three-dimensional virtual uniform cubic array $\overline{\mathbb{W}}$ in step (4) can be obtained by selecting elements in the equivalent signal tensor $\mathcal{U}_{\mathbb{W}}$ of the three-dimensional virtual non-uniform cubic array $\mathbb{W}$ corresponding to locations of virtual array elements in the $\overline{\mathbb{W}}$.

Further, in step (6), CANDECOMP/PARAFAC decomposition is carried out on the four-dimensional virtual domain signal tensor $\mathcal{G}$ to obtain factor matrixes $\overline{B}_x = [\overline{b}_x(\mu_1), \overline{b}_x(\mu_2), \ldots, \overline{b}_x(\mu_K)]$, $\overline{B}_y = [\overline{b}_y(\nu_1), \overline{b}_y(\nu_2), \ldots, \overline{b}_y(\nu_K)]$, $\overline{B}_z = [\overline{b}_z(\omega_1), \overline{b}_z(\omega_2), \ldots, \overline{b}_z(\omega_K)]$ and $C = [c(\mu_1, \nu_1, \omega_1), c(\mu_2, \nu_2, \omega_2), \ldots, c(\mu_K, \nu_K, \omega_K)]$, wherein, CANDECOMP/PARAFAC decomposition of the four-dimensional virtual domain signal tensor $\mathcal{G}$ follows a uniqueness condition as follows:

$$k_{rank}(\overline{B}_x) + k_{rank}(\overline{B}_y) + k_{rank}(\overline{B}_z) + k_{rank}(C) \geq 2K+3,$$

wherein, $k_{rank}(\bullet)$ represents a Kruskal rank of a matrix, and $k_{rank}(\overline{B}_x) = \min(3M_x^{(Q_1)} - M_x^{(Q_2)} + 1, K)$, $k_{rank}(\overline{B}_y) = \min(3M_y^{(Q_1)} - M_y^{(Q_2)} + 1, K)$, $k_{rank}(\overline{B}_z) = \min(3M_z^{(Q_1)} - M_z^{(Q_2)} - 1, K)$, $k_{rank}(C) = \min(2, K)$, $\min(\bullet)$ represents an operation of taking a minimum value; when spatial smoothing is not introduced to process the deduced four-dimensional virtual domain signal tensor $\mathcal{G}$, a uniqueness inequation of the above CANDECOMP/PARACFAC decomposition is established, indicating that angle information of a signal source can be effectively extracted in the method of the present disclosure in no need of a spatial smoothing step.

Further, in step (7), a process of obtaining a direction-of-arrival estimation result by three-dimensional spatial spectrum search specifically comprises: fixing a value of $\varphi$ at 0°, gradually increasing $\theta$ to 90° from −90° at an interval of 0.1°, increasing the $\varphi$ to 0.1° from 0°, increasing the $\theta$ to 90° from −90° at an interval of 0.1° once again, and repeating this process until the $\varphi$ is increased to 180°, calculating a corresponding $\mathcal{P}(\theta,\varphi)$ in each two-dimensional direction-of-arrival of $(\theta,\varphi)$ so as to construct a three-dimensional spatial spectrum in a two-dimensional direction-of-arrival plane; and searching peak values of the three-dimensional spatial spectrum $\mathcal{P}(\theta,\varphi)$ in the two-dimensional direction-of-arrival plane, permutating response values corresponding to these peak values in a descending order, and taking two-dimensional angle values corresponding to first K spectral peaks as the direction-of-arrival estimation result of a corresponding signal source.

Compared with the prior art, the present disclosure has the following advantages:

(1) a tensor is used to represent a multi-dimensional receiving signal of a three-dimensional co-prime cubic array in the present disclosure, which, compared with a traditional vectorized signal processing method, effectively retains the original structured information of multi-dimensional receiving signals, de-structures space information and time information of a tensor signal using a tensor algebra tool, and avoids aliasing of multi-dimensional time-space information;

(2) in the present disclosure, a multi-dimensional virtual domain equivalent signal tensor is deduced based on six-dimensional cross-correlation tensor statistics, solving the failure problem of a traditional autocorrelation statistics-based linear virtual domain deduction method in a three-dimensional co-prime cubic array scene, establishing relevance between co-prime tensor signals and multi-dimensional virtual domains, and laying a foundation for realizing Nyquist matched direction-of-arrival estimation;

(3) in the present disclosure, usable information of the three-dimensional co-prime cubic array virtual domain is fully mined, a directly decomposable four-dimensional virtual domain signal tensor is constructed by mirror image augmentation of the three-dimensional virtual uniform cubic array, and direction-of-arrival estimation of a signal source is realized without introducing a spatial smoothing step.

DETAILED DESCRIPTION OF THE EMBODIMENTS

The technical solution of the present disclosure will be further explained in detail by referring to the appended drawings.

Figure 1:
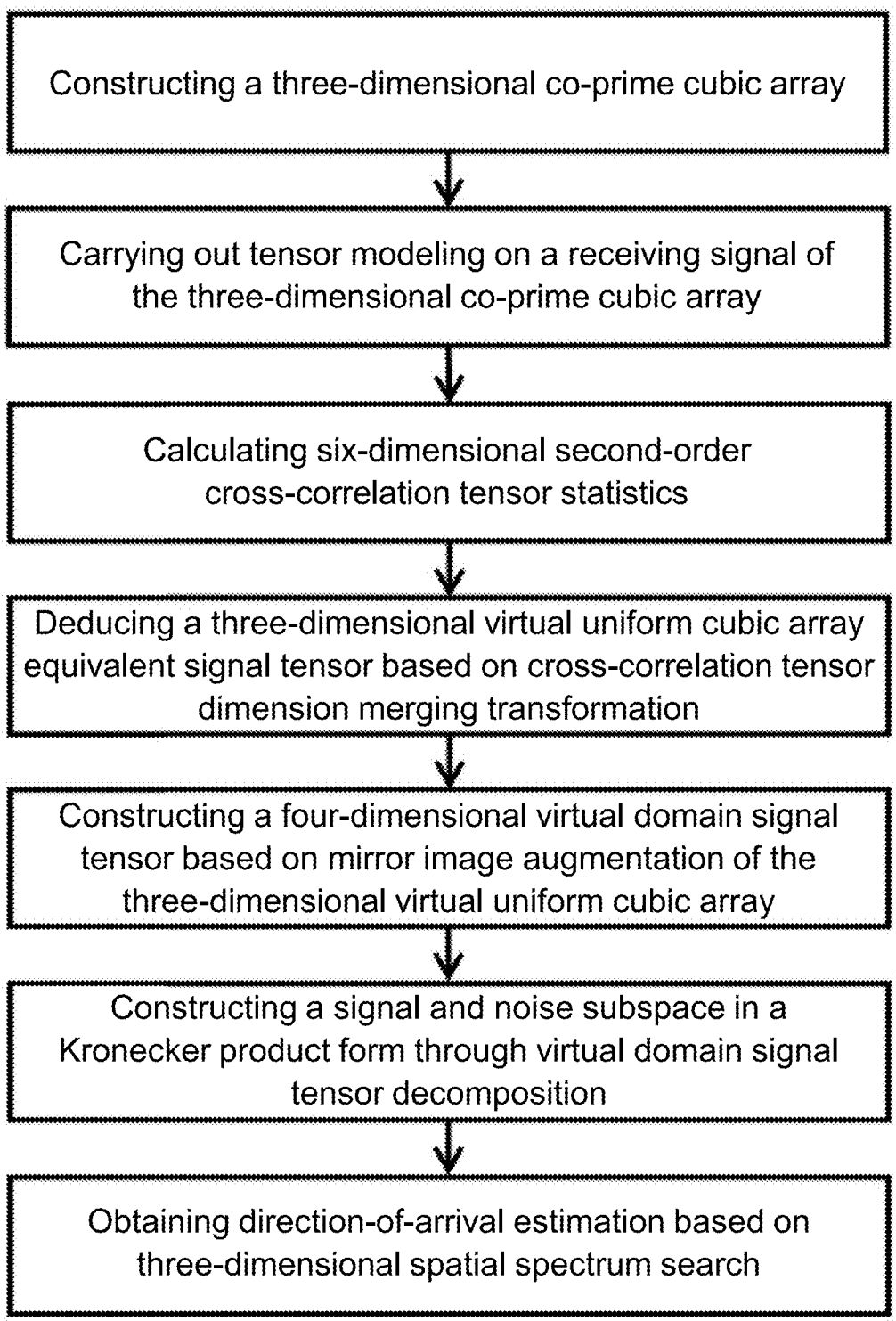
FIG. 1 is an overall flow block diagram of the present disclosure.
Figure 2:
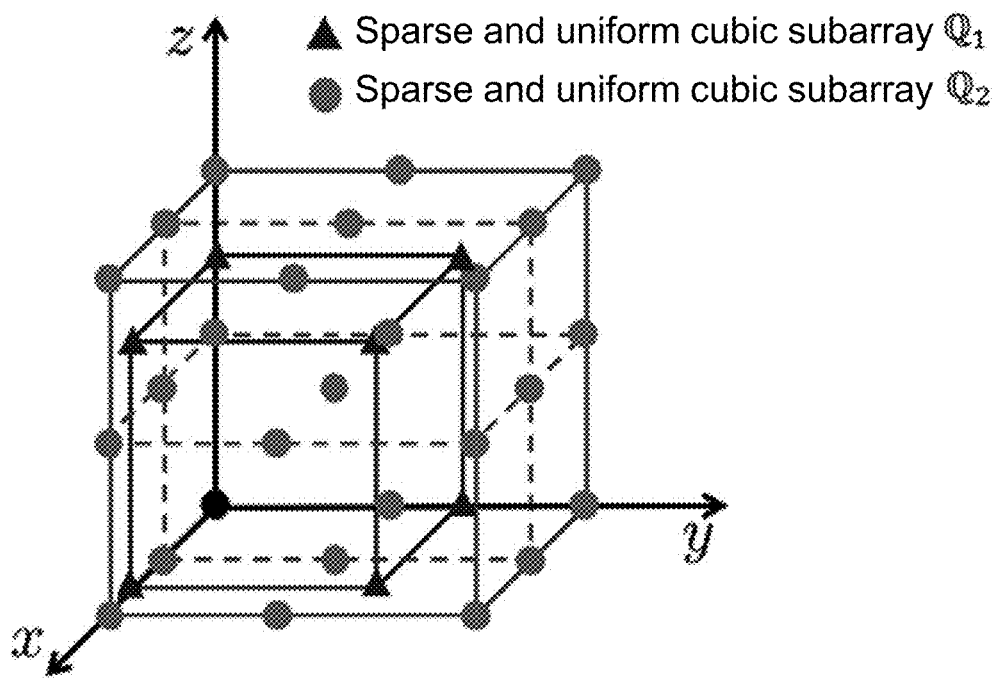
FIG. 2 is a schematically structural diagram of a three-dimensional co-prime cubic array of the present disclosure.
Figure 3:
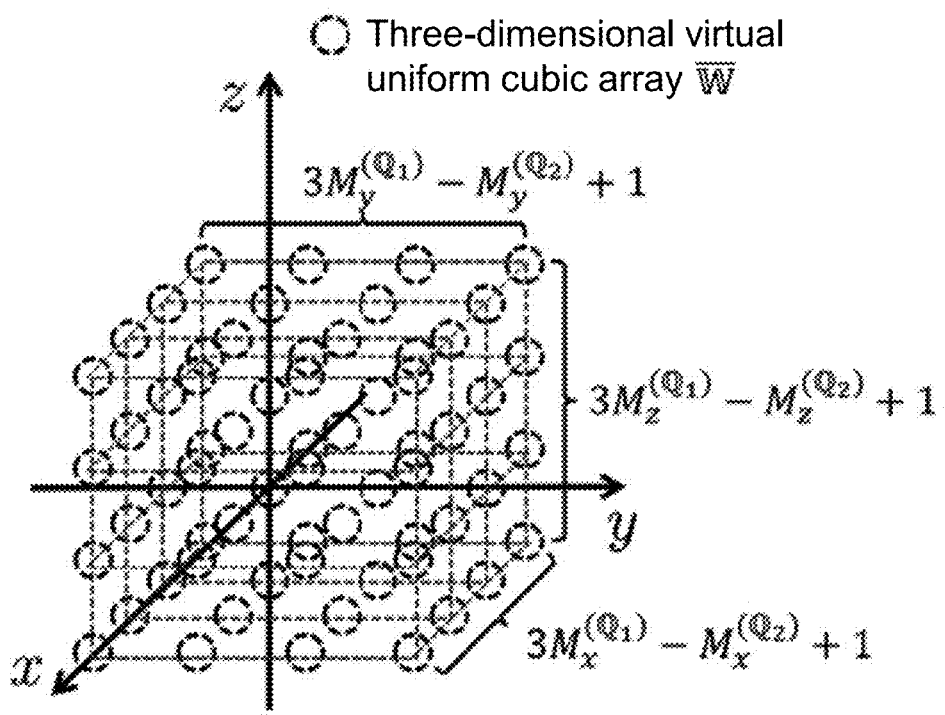
FIG. 3 is a schematically structural diagram of a deduced three-dimensional virtual uniform cubic array of the present disclosure.

In order to solve the problems of multi-dimensional signal structured information loss and Nyquist mismatch in existing methods, the present disclosure puts forwards a three-dimensional co-prime cubic array direction-of-arrival estimation method based on a cross-correlation tensor. In combination with cross-correlation tensor statistic analysis, multi-dimensional virtual domain tensor space extension, cross-correlation virtual domain signal tensor decomposition and other means, relevance between three-dimensional co-prime cubic array cross-correlation tensor statistics and a virtual domain is established to realize Nyquist matched two-dimensional direction-of-arrival estimation. As shown in FIG. 1, the present disclosure comprises the following implementing steps:

step 1: constructing a three-dimensional co-prime cubic array. The three-dimensional co-prime cubic array is constructed at a receiving end with $M_x^{(\mathbb{Q}_1)} M_y^{(\mathbb{Q}_1)} M_z^{(\mathbb{Q}_1)} + M_x^{(\mathbb{Q}_2)} M_y^{(\mathbb{Q}_2)} M_z^{(\mathbb{Q}_2)} -1$ physical antenna array elements; as shown in FIG. 2, a pair of three-dimensional sparse and uniform cubic subarrays $\mathbb{Q}_1$ and $\mathbb{Q}_2$ are constructed in a rectangular coordinate system, wherein $\mathbb{Q}_1$ comprises $M_x^{(\mathbb{Q}_1)} \times M_y^{(\mathbb{Q}_1)} \times M_z^{(\mathbb{Q}_1)}$ antenna array elements, with array element spacings in the directions of the x axis, the y axis and the z axis being $M_x^{(\mathbb{Q}_2)} d$, $M_y^{(\mathbb{Q}_2)} d$ and $M_z^{(\mathbb{Q}_2)} d$ respectively, with locations in the rectangular coordinate system being $\{(M_x^{(\mathbb{Q}_2)} dm_{1x}, M_y^{(\mathbb{Q}_2)} dm_{1y}, M_z^{(\mathbb{Q}_2)} dm_{1z})$, $m_{1x}=0,1,\ldots, M_x^{(\mathbb{Q}_1)}-1$, $m_{1y}=0,1,\ldots, M_y^{(\mathbb{Q}_1)}-1$, $m_{1z}=0,1,\ldots, M_z^{(\mathbb{Q}_1)}-1\}$; $\mathbb{Q}_2$ comprises $M_x^{(\mathbb{Q}_2)} \times M_y^{(\mathbb{Q}_2)} \times M_z^{(\mathbb{Q}_2)}$ antenna array elements, with array element spacings in the directions of the x axis, the y axis and the z axis being $M_x^{(\mathbb{Q}_1)} d$, $M_y^{(\mathbb{Q}_1)} d$ and $M_z^{(\mathbb{Q}_1)} d$ respectively, with locations in the rectangular coordinate system being $\{(M_x^{(\mathbb{Q}_1)} dm_{2x}, M_y^{(\mathbb{Q}_1)} dm_{2y}, M_z^{(\mathbb{Q}_1)} dm_{2z})$, $m_{2x}=0,1,\ldots, M_x^{(\mathbb{Q}_2)}-1$, $m_{2y}=0,1,\ldots, M_y^{(\mathbb{Q}_2)}-1$, $3_{2z}=0,1,\ldots, M_z^{(\mathbb{Q}_2)}-1\}$; wherein $M_x^{(\mathbb{Q}_1)}$ and $M_x^{(\mathbb{Q}_2)}$, $M_y^{(\mathbb{Q}_1)}$ and $M_y^{(\mathbb{Q}_2)}$, and $M_z^{(\mathbb{Q}_1)}$ and $M_z^{(\mathbb{Q}_2)}$ are respectively a pair of co-prime integers; a unit spacing d has a value half of an incident narrowband signal wavelength $\lambda$, i.e., $d=\lambda/2$; subarray combination is carried out on the $\mathbb{Q}_1$ and $\mathbb{Q}_2$ in such a way that array elements on the (0,0,0) location in the rectangular coordinate system are overlapped so as to obtain a three-dimensional co-prime cubic array actually containing $M_x^{(\mathbb{Q}_1)} M_y^{(\mathbb{Q}_1)} M_z^{(\mathbb{Q}_1)} + M_x^{(\mathbb{Q}_2)} M_y^{(\mathbb{Q}_2)} M_z^{(\mathbb{Q}_2)} -1$ physical antenna array elements.

step 2: carrying out tensor modeling on a receiving signal of the three-dimensional co-prime cubic array. Supposing there are K far-field narrowband non-coherent signal sources from a direction of $\{(\theta_1,\varphi_1), (\theta_2,\varphi_2), \ldots, (\theta_K,\varphi_K)\}$, a sampling snapshot signal at the time t of the sparse and uniform cubic subarray $\mathbb{Q}_i$ of the three-dimensional co-prime cubic array is represented by a three-dimensional space information-covered tensor $\mathcal{X}_{\mathbb{Q}_i}(t) \in \mathbb{C}^{M_x^{(\mathbb{Q}_i)} \times M_y^{(\mathbb{Q}_i)} \times M_z^{(\mathbb{Q}_i)}}$, receiving signal tensors $\mathcal{X}_{\mathbb{Q}_i}(t)$ of T sampling snapshots are superposed in a fourth dimension (i.e., time dimension) to obtain a four-dimensional receiving signal tensor $\mathcal{X}_{\mathbb{Q}_i} \in \mathbb{C}^{M_x^{(\mathbb{Q}_i)} \times M_y^{(\mathbb{Q}_i)} \times M_z^{(\mathbb{Q}_i)} \times T}$ corresponding to the sparse and uniform cubic subarray $\mathbb{Q}_i$, modeled as:

$$\mathcal{X}_{\mathbb{Q}_i} = \sum_{k=1}^{K} a_x^{(\mathbb{Q}_i)}(\mu_k) \circ a_y^{(\mathbb{Q}_i)}(\nu_k) \circ a_z^{(\mathbb{Q}_i)}(\omega_k) \circ s_k + \mathcal{N}_{\mathbb{Q}_i},$$

wherein, $s_k = [s_{k,1}, s_{k,2}, \ldots, s_{k,T}]^T$ is a multi-snapshot sampling signal waveform corresponding to a $k^{th}$ incident signal source, $(\bullet)^T$ represents a transposition operation, $\circ$ represents an external product of vectors, $\mathcal{N}_{\mathbb{Q}_i} \in \mathbb{C}^{M_x^{(\mathbb{Q}_i)} \times M_y^{(\mathbb{Q}_i)} \times M_z^{(\mathbb{Q}_i)} \times T}$ is a noise tensor mutually independent from each signal source, $a_x^{(\mathbb{Q}_i)}(\mu_k)$, $a_y^{(\mathbb{Q}_i)}(\nu_k)$ and $a_z^{(\mathbb{Q}_i)}(\omega_k)$ are steering vectors of the three-dimensional sparse and uniform cubic subarray $\mathbb{Q}_i$ in the directions of the x axis, the y axis and the z axis respectively, and a signal source corresponding to a direction-of-arrival of $(\theta_k, \varphi_k)$ is represented as:

$$a_x^{(\mathbb{Q}_i)}(\mu_k) = \left[1, e^{-j\pi x_{\mathbb{Q}_i}^{(2)} \mu_k}, \ldots, e^{-j\pi x_{\mathbb{Q}_i}^{(M_x^{(\mathbb{Q}_i)})} \mu_k}\right]^T,$$

$$a_y^{(\mathbb{Q}_i)}(\nu_k) = \left[1, e^{-j\pi y_{\mathbb{Q}_i}^{(2)} \nu_k}, \ldots, e^{-j\pi y_{\mathbb{Q}_i}^{(M_y^{(\mathbb{Q}_i)})} \nu_k}\right]^T,$$

$$a_z^{(\mathbb{Q}_i)}(\omega_k) = \left[1, e^{-j\pi z_{\mathbb{Q}_i}^{(2)} \omega_k}, \ldots, e^{-j\pi z_{\mathbb{Q}_i}^{(M_z^{(\mathbb{Q}_i)})} \omega_k}\right]^T,$$

wherein, $x_{\mathbb{Q}_i}^{(i_1)}$ ($i_1=1,2,\ldots,M_x^{(\mathbb{Q}_i)}$), $y_{\mathbb{Q}_i}^{(i_2)}$ ($i_2=1,2,\ldots,M_y^{(\mathbb{Q}_i)}$) and $z_{\mathbb{Q}_i}^{(i_3)}$ ($i_3=1,2,\ldots,M_z^{(\mathbb{Q}_i)}$) respectively represent actual locations of $\mathbb{Q}_i$ in $i_1^{th}$, $i_2^{th}$ and $i_3^{th}$ physical antenna array elements in the directions of the x axis, the y axis and the z axis, and $x_{\mathbb{Q}_i}^{(1)} = y_{\mathbb{Q}_i}^{(1)} = z_{\mathbb{Q}_i}^{(1)} = 0$, $\mu_k = \sin(\varphi_k)\cos(\theta_k)$, $\nu_k = \sin(\varphi_k)\sin(\theta_k)$, $\omega_k = \cos(\varphi_k)$, $j = \sqrt{-1}$;

step 3: calculating six-dimensional second-order cross-correlation tensor statistics. As receiving signal tensors $\mathcal{X}_{\mathbb{Q}_1}$ and $\mathcal{X}_{\mathbb{Q}_2}$ of the two subarrays $\mathbb{Q}_1$ and $\mathbb{Q}_2$ meet characteristics of co-prime numbers in structure size, it is unable to superpose $\mathcal{X}_{\mathbb{Q}_1}$ and $\mathcal{X}_{\mathbb{Q}_2}$ into a tensor signal and then to calculate its second-order autocorrelation statistics. Therefore, their cross-correlation statistics are solved to obtain a six-dimensional space information-covered second-order cross-correlation tensor $\mathcal{R}_{\mathbb{Q}_1 \mathbb{Q}_2} \in \mathbb{C}^{M_x^{(\mathbb{Q}_1)} \times M_y^{(\mathbb{Q}_1)} \times M_z^{(\mathbb{Q}_1)} \times M_x^{(\mathbb{Q}_2)} \times M_y^{(\mathbb{Q}_2)} \times M_z^{(\mathbb{Q}_2)}}$, calculated as:

$$\mathcal{R}_{\mathbb{Q}_1 \mathbb{Q}_2} = E[<\mathcal{X}_{\mathbb{Q}_1}, \mathcal{X}_{\mathbb{Q}_2}^* >_4] =$$

$$\sum_{k=1}^{K} \sigma_k^2 a_x^{(\mathbb{Q}_1)}(\mu_k) \circ a_y^{(\mathbb{Q}_1)}(\nu_k) \circ a_z^{(\mathbb{Q}_1)}(\omega_k) \circ a_x^{(\mathbb{Q}_2)^*}(\mu_k) \circ a_y^{(\mathbb{Q}_2)^*}(\nu_k) \circ a_z^{(\mathbb{Q}_2)^*}(\omega_k) + \mathcal{N}_{\mathbb{Q}_1 \mathbb{Q}_2},$$

wherein, $\sigma_k^2 = E[s_k s_k^*]$ represents a power of a $k^{th}$ incident signal source, $\mathcal{N}_{\mathbb{Q}_1 \mathbb{Q}_2} = E[<\mathcal{N}_{\mathbb{Q}_1}, \mathcal{N}_{\mathbb{Q}_2}^* >_4]$ represents a six-dimensional cross-correlation noise tensor, $<\bullet,\bullet>_r$ represents a tensor contraction operation of two tensors along a $r^{th}$ dimension, $E[\bullet]$ represents an operation of taking a mathematic expectation, and $(\bullet)^*$ represents a conjugate operation. A six-dimensional tensor $\mathcal{N}_{\mathbb{Q}_1 \mathbb{Q}_2}$ merely has an element with a value of $\sigma_n^2$ on a $(1,1,1,1,1,1)^{th}$ location, $\sigma_n^2$ representing a noise power, and with a value of 0 on other locations. In fact, their cross-correlation statistics of receiving signal tensors $\mathcal{X}_{\mathbb{Q}_1}(t)$ and $\mathcal{X}_{\mathbb{Q}_2}(t)$ of T sampling snapshots are solved to obtain a second-order sampling cross-correlation tensor $\hat{\mathcal{R}}_{\mathbb{Q}_1 \mathbb{Q}_2} \in \mathbb{C}^{M_x^{(\mathbb{Q}_1)} \times M_y^{(\mathbb{Q}_1)} \times M_z^{(\mathbb{Q}_1)} \times M_x^{(\mathbb{Q}_2)} \times M_y^{(\mathbb{Q}_2)} \times M_z^{(\mathbb{Q}_2)}}$:

$$\hat{\mathcal{R}}_{\mathbb{Q}_1 \mathbb{Q}_2} = \frac{1}{T} \sum_{t=1}^{T} \mathcal{X}_{\mathbb{Q}_1}(t) \circ \mathcal{X}_{\mathbb{Q}_2}^*(t);$$

step 4: deducing a three-dimensional virtual uniform cubic array equivalent signal tensor based on cross-correlation tensor dimension merging transformation. As a cross-correlation tensor $\mathcal{R}_{\mathbb{Q}_1 \mathbb{Q}_2}$ contains three-dimensional space information respectively corresponding to the two sparse and uniform cubic subarrays $\mathbb{Q}_1$ and $\mathbb{Q}_2$, and by merging dimensions representing space information of a same direction in the $\mathcal{R}_{\mathbb{Q}_1 \mathbb{Q}_2}$, arrays of difference sets are formed on exponential terms of the steering vectors corresponding to the two co-prime subarrays so as to construct an augmented virtual array in a three-dimensional space. Specifically, as a first dimension and a fourth dimension (represented by steering vectors $a_x^{(\mathbb{Q}_1)}(\mu_k)$ and $a_x^{(\mathbb{Q}_2)^*}(\mu_k)$) of the cross-correlation tensor $\mathcal{R}_{\mathbb{Q}_1 \mathbb{Q}_2}$ represent space information in the direction of the x axis, a second dimension and a fifth dimension (represented by steering vectors $a_y^{(\mathbb{Q}_1)}(\nu_k)$ and $a_y^{(\mathbb{Q}_2)^*}(\nu_k)$) represent space information in the direction of the y axis, and a third dimension and a sixth dimension (represented by steering vectors $a_z^{(\mathbb{Q}_1)}(\omega_k)$ and $a_z^{(\mathbb{Q}_2)^*}(\omega_k)$) represent space information in the direction of the z axis, dimension sets $\mathbb{J}_1 = \{1,4\}$, $\mathbb{J}_2 = \{2,5\}$ and $\mathbb{J}_3 = \{3,6\}$ are defined, and tensor transformation of dimension merging is carried out on the cross-correlation tensor $\mathcal{R}_{\mathbb{Q}_1 \mathbb{Q}_2}$ to obtain a virtual domain second-order equivalent signal tensor $\mathcal{U}_{\mathbb{W}} \in \mathbb{C}^{M_x^{(\mathbb{Q}_1)} M_x^{(\mathbb{Q}_2)} \times M_y^{(\mathbb{Q}_1)} M_y^{(\mathbb{Q}_2)} \times M_z^{(\mathbb{Q}_1)} M_z^{(\mathbb{Q}_2)}}$:

$$\mathcal{U}_{\mathbb{W}} \triangleq \mathcal{R}_{\mathbb{Q}_1 \mathbb{Q}_2 [\mathbb{J}_1, \mathbb{J}_2, \mathbb{J}_3]} = \sum_{k=1}^{K} \sigma_k^2 b_x(\mu_k) \circ b_y(\nu_k) \circ b_z(\omega_k),$$

wherein, $b_x(\mu_k) = a_x^{(\mathbb{Q}_2)^*}(\mu_k) \otimes a_x^{(\mathbb{Q}_1)}(\mu_k)$, $b_y(\nu_k) = a_y^{(\mathbb{Q}_2)^*}(\nu_k) \otimes a_y^{(\mathbb{Q}_1)}(\nu_k)$ and $b_z(\omega_k) = a_z^{(\mathbb{Q}_2)^*}(\omega_k) \otimes a_z^{(\mathbb{Q}_1)}(\omega_k)$ respectively construct augmented virtual arrays in the directions of the x axis, the y axis and the z axis through forming arrays of difference sets on exponential terms, $b_x(\mu_k)$, $b_y(\nu_k)$ and $b_z(\omega_k)$ are respectively equivalent to steering vectors of the virtual arrays in the x axis, the y axis and the z axis to correspond to signal sources in a direction-of-arrival of $(\theta_k, \varphi_k)$ and $\otimes$ represents a product of Kronecker. Therefore, $\mathcal{U}_{\mathbb{W}}$ corresponds to an augmented three-dimensional virtual non-uniform cubic array $\mathbb{W}$. To simplify a deduction process, a six-dimensional noise tensor $\mathcal{N}_{\mathbb{Q}_1 \mathbb{Q}_2}$ is omitted in a theoretical modeling step about $\mathcal{U}_{\mathbb{W}}$. However, in fact, by replacing theoretical cross-correlation tensor statistics $\mathcal{R}_{\mathbb{Q}_1 \mathbb{Q}_2}$ with sampling cross-correlation tensor statistics $\hat{\mathcal{R}}_{\mathbb{Q}_1 \mathbb{Q}_2}$, $\mathcal{N}_{\mathbb{Q}_1 \mathbb{Q}_2}$ is naturally covered in a cross-correlation tensor signal statistic processing process;

$\mathbb{W}$ comprises a three-dimensional uniform cubic array $\overline{\mathbb{W}}$ with $(3M_x^{(\mathbb{Q}_1)} - M_x^{(\mathbb{Q}_2)} + 1) \times (3M_y^{(\mathbb{Q}_1)} - M_y^{(\mathbb{Q}_2)} + 1) \times (3M_z^{(\mathbb{Q}_1)} - M_z^{(\mathbb{Q}_2)} + 1)$ virtual array elements, represented as:

$$\overline{\mathbb{W}} = \{(x,y,z) | x = p_x d, y = p_y d, z = p_z d, -M_x^{(\mathbb{Q}_1)} \leq p_x \leq -M_x^{(\mathbb{Q}_2)} + 2M_x^{(\mathbb{Q}_1)}, -M_y^{(\mathbb{Q}_1)} \leq p_y \leq -M_y^{(\mathbb{Q}_2)} + 2M_y^{(\mathbb{Q}_1)}, -M_z^{(\mathbb{Q}_1)} \leq p_z \leq -M_z^{(\mathbb{Q}_2)} + 2M_z^{(\mathbb{Q}_1)}\}.$$

The equivalent signal tensor $\overline{\mathcal{U}}_{\overline{\mathbb{W}}} \in \mathbb{C}^{(3M_x^{(\mathbb{Q}_1)} - M_x^{(\mathbb{Q}_2)} + 1) \times (3M_y^{(\mathbb{Q}_1)} - M_y^{(\mathbb{Q}_2)} + 1) \times (3M_z^{(\mathbb{Q}_1)} - M_z^{(\mathbb{Q}_2)} + 1)}$ of the three-dimensional virtual uniform cubic array $\overline{\mathbb{W}}$ can be obtained by selecting elements in $\mathcal{U}_{\mathbb{W}}$ that correspond to locations of virtual array elements in the $\overline{\mathbb{W}}$, modeled as:

$$\overline{u}_{\overline{\mathbb{W}}} = \Sigma_{k=1}^{K} \sigma_k^2 \overline{b}_x(\mu_k) \circ \overline{b}_y(\nu_k) \circ \overline{b}_z(\omega_k),$$

wherein, $$\overline{b}_x(\mu_k) = \left[ e^{-j\pi(-M_x^{(Q_1)})\mu_k}, e^{-j\pi(-M_x^{(Q_1)}+1)\mu_k}, \ldots, e^{-j\pi(-M_x^{(Q_2)}+2M_x^{(Q_1)})\mu_k} \right]^T \in$$

$$\mathbb{C}^{3M_x^{(Q_1)} - M_x^{(Q_2)} + 1},$$

$$\overline{b}_y(\nu_k) = \left[ e^{-j\pi(-M_y^{(Q_1)})\nu_k}, e^{-j\pi(-M_y^{(Q_1)}+1)\nu_k}, \ldots, e^{-j\pi(-M_y^{(Q_2)}+2M_y^{(Q_1)})\nu_k} \right]^T \in$$

$$\mathbb{C}^{3M_y^{(Q_1)} - M_y^{(Q_2)} + 1} \text{ and } \overline{b}_z(\omega_k) =$$

$$\left[ e^{-j\pi(-M_z^{(Q_1)})\omega_k}, e^{-j\pi(-M_z^{(Q_1)}+1)\omega_k}, \ldots, e^{-j\pi(-M_z^{(Q_2)}+2M_z^{(Q_1)})\omega_k} \right]^T \in$$

$$\mathbb{C}^{3M_z^{(Q_1)} - M_z^{(Q_2)} + 1}$$

respectively represent steering vectors of the three-dimensional virtual uniform cubic array $\overline{\mathbb{W}}$ in the x axis, the y axis and the z axis corresponding to signal sources in the direction-of-arrival of $(\theta_k, \varphi_k)$;

step 5: constructing a four-dimensional virtual domain signal tensor based on mirror image augmentation of the three-dimensional virtual uniform cubic array. As the three-dimensional virtual uniform cubic array $\overline{\mathbb{W}}$ obtained based on cross-correlation tensor dimension merging transformation is not symmetric about a coordinate axis, in order to increase an effective aperture of a virtual array, considering that a mirror image portion $\overline{\mathbb{W}}_{sym}$ of the three-dimensional virtual uniform cubic array $\overline{\mathbb{W}}$ is represented as:

$$\overline{\mathbb{W}}_{sym} = \{(x,y,z) | x = \check{p}_x d, y = \check{p}_y d, z = \check{p}_z d, M_x^{(Q_2)} - 2$$
$$M_x^{(Q_1)} \leq \check{p}_x \leq M_x^{(Q_1)}, M_y^{(Q_2)} - 2M_y^{(Q_1)} \leq \check{p}_y \leq M_y^{(Q_1)},$$
$$M_z^{(Q_2)} - 2M_z^{(Q_1)} \leq \check{p}_z \leq M_z^{(Q_1)} \}.$$

Transformation is carried out by using the equivalent signal tensor $\overline{u}_{\overline{\mathbb{W}}}$ of the three-dimensional virtual uniform cubic array $\overline{\mathbb{W}}$ to obtain an equivalent signal tensor $\overline{u}_{\overline{\mathbb{W}}\ sym} \in \mathbb{C}^{(3M_x^{(Q_1)} - M_x^{(Q_2)} + 1) \times (3M_y^{(Q_1)} - M_y^{(Q_2)} + 1) \times (3M_z^{(Q_1)} - M_z^{(Q_2)} + 1)}$ of a mirror image virtual uniform cubic array $\overline{\mathbb{W}}_{sym}$. It specifically comprises: a conjugate operation is carried out on the three-dimensional virtual domain signal tensor $\overline{u}_{\overline{\mathbb{W}}}$ to obtain $\overline{u}_{\overline{\mathbb{W}}}^*$, position reversal is carried out on elements in the $\overline{u}_{\overline{\mathbb{W}}}^*$ along directions of three dimensions successively so as to obtain the equivalent signal tensor $\overline{u}_{\overline{\mathbb{W}}\ sym}$ corresponding to the $\overline{\mathbb{W}}_{sym}$;

the equivalent signal tensor $\overline{u}_{\overline{\mathbb{W}}}$ of the three-dimensional virtual uniform cubic array $\overline{\mathbb{W}}$ and the equivalent signal tensor $\overline{u}_{\overline{\mathbb{W}}\ sym}$ of the mirror image virtual uniform cubic array $\overline{\mathbb{W}}_{sym}$ are superposed in the fourth dimension (i.e., a dimension representing mirror image transformation information) to obtain a four-dimensional virtual domain signal tensor $\mathcal{G} \in \mathbb{C}^{(3M_x^{(Q_1)} - M_x^{(Q_2)} + 1) \times (3M_y^{(Q_1)} - M_y^{(Q_2)} + 1) \times (3M_z^{(Q_1)} - M_z^{(Q_2)} + 1) \times 2}$, modeled as:

$$\mathcal{G} = \Sigma_{k=1}^{K} \sigma_k^2 \overline{b}_x(\mu_k) \circ \overline{b}_y(\nu_k) \circ \overline{b}_z(\omega_k) \circ c(\mu_k, \nu_k, \omega_k),$$

wherein, $$c(\mu_k, \nu_k, \omega_k) = \left[ 1, e^{-j\pi\left((M_x^{(Q_2)} - M_x^{(Q_1)})\mu_k + (M_y^{(Q_2)} - M_y^{(Q_1)})\nu_k + (M_z^{(Q_2)} - M_z^{(Q_1)})\omega_k\right)} \right]^T$$

is a three-dimensional space mirror image transformation factor vector;

step 6: constructing a signal and noise subspace in the form of a Kronecker product by virtual domain signal tensor decomposition. CANDECOMP/PARAFAC decomposition is carried out on the four-dimensional virtual domain signal tensor $\mathcal{G}$ to obtain factor vectors $\overline{b}_x(\mu_k), \overline{b}_y(\nu_k), \overline{b}_z(\omega_k)$ and $c(\mu_k, \nu_k, \omega_k)$, $k=1,2,\ldots,K$, corresponding to four-dimensional space information, and $\overline{B}_x = [\overline{b}_x(\mu_1)\ \overline{b}_x(\mu_2),\ldots, \overline{b}_x(\mu_K)]$, $\overline{B}_y = [\overline{b}_y(\nu_1),\ \overline{b}_y(\nu_2),\ldots,\ \overline{b}_y(\nu_K)], \overline{B}_z = [\overline{b}_z(\omega_1), \overline{b}_z(\omega_2),\ldots,\ \overline{b}_z(\omega_K)]$ and $C = [c(\mu_1,\nu_1,\omega_1), c(\mu_2,\nu_2,\omega_2),\ldots, c(\mu_K,\nu_K,\omega_K)]$ are used to represent factor matrixes. At this point, CANDECOMP/PARAFAC decomposition of the four-dimensional virtual domain signal tensor $\mathcal{G}$ follows a uniqueness condition as follows:

$$k_{rank}(\overline{B}_x) + k_{rank}(\overline{B}_y) + k_{rank}(\overline{B}_z) + k_{rank}(C) \geq 2K+3,$$

wherein, $k_{rank}(\bullet)$ represents a Kruskal rank of a matrix, and $k_{rank}(\overline{B}_x) = \min(3M_x^{(Q_1)} - M_x^{(Q_2)} + 1, K)$, $k_{rank}(\overline{B}_y) = \min(3M_y^{(Q_1)} - M_y^{(Q_2)} + 1, K)$, $k_{rank}(\overline{B}_z) = \min(3M_z^{(Q_1)} - M_z^{(Q_2)} + 1, K)$, $k_{rank}(C) = \min(2, K)$, $\min(\bullet)$ represents an operation of taking a minimum value; when spatial smoothing is not introduced to process the deduced four-dimensional virtual domain signal tensor $\mathcal{G}$, a uniqueness inequation of the above CANDECOMP/PARACFAC decomposition is established, indicating that angle information of a signal source can be effectively extracted by the method in the present disclosure in no need of a spatial smoothing step. Further, factor vectors $\overline{b}_x(\mu_k), \overline{b}_y(\nu_k), \overline{b}_z(\omega_k)$ and $c(\mu_k, \nu_k, \omega_k)$ are obtained by tensor decomposition, and a signal subspace $V_s \in \mathbb{C}^{V \times K}$ is constructed through a form of their Kronecker products:

$$V_s = \text{orth}([\overline{b}_x(\mu_1) \otimes \overline{b}_y(\nu_1) \otimes \overline{b}_z(\omega_1) \otimes c(\mu_1,\nu_1,\omega_1),$$
$$\overline{b}_x(\mu_2) \otimes \overline{b}_y(\nu_2) \otimes \overline{b}_z(\omega_2) \otimes c(\mu_2,\nu_2,\omega_2), \ldots,$$
$$\overline{b}_x(\mu_K) \otimes \overline{b}_y(\nu_K) \otimes \overline{b}_z(\omega_K) \otimes c(\mu_K,\nu_K,\omega_K)]),$$

wherein, $\text{orth}(\bullet)$ represents a matrix orthogonalization operation, $V = 2(3M_x^{(Q_1)} - M_x^{(Q_2)} + 1)(3M_y^{(Q_1)} - M_y^{(Q_2)} + 1)(3M_z^{(Q_1)} - M_z^{(Q_2)} + 1)$; by using $V_n \in \mathbb{C}^{V \times (V-K)}$ to represent a noise subspace, $V_n V_n^H$ is obtained by $V_s$:

$$V_n V_n^H = I - V_s V_s^H,$$

wherein, I represents a unit matrix; $(\bullet)^H$ represents a conjugate transposition operation;

step 7: obtaining a direction-of-arrival estimation result based on three-dimensional spatial spectrum search. A two-dimensional direction-of-arrival of $(\tilde{\theta}, \tilde{\varphi})$ is traversed, corresponding parameters $\tilde{\mu}_k = \sin(\tilde{\varphi}_k)\cos(\tilde{\theta}_k)$, $\tilde{\nu}_k = \sin(\tilde{\varphi}_k)\sin(\tilde{\theta}_k)$ and $\tilde{\omega}_k = \cos(\tilde{\varphi}_k)$ are calculated, and a steering vector $\tilde{\mathcal{U}}(\tilde{\mu}_k, \tilde{\nu}_k, \tilde{\omega}_k) \in \mathbb{C}^V$ corresponding to the three-dimensional virtual uniform cubic array W is constructed, represented as:

$$\tilde{\mathcal{U}}(\tilde{\mu}_k, \tilde{\nu}_k, \tilde{\omega}_k) = \overline{b}_x(\tilde{\mu}_k) \otimes \overline{b}_y(\tilde{\nu}_k) \otimes \overline{b}_z(\tilde{\omega}_k) \otimes c(\tilde{\mu}_k, \tilde{\nu}_k, \tilde{\omega}_k),$$

wherein, $\tilde{\theta} \in [-90°, 90°]$, $\tilde{\varphi} \in [0°, 180°]$. A three-dimensional spatial spectrum $\mathcal{P}(\tilde{\theta}, \tilde{\varphi})$ is calculated as follows:

$$\mathcal{P}(\tilde{\theta},\tilde{\varphi}) = 1/(\tilde{\mathcal{U}}^H(\tilde{\mu}_k,\tilde{\nu}_k,\tilde{\omega}_k)(V_n V_n^H) \tilde{\mathcal{U}}(\tilde{\mu}_k,\tilde{\nu}_k,\tilde{\omega}_k)).$$

Spectral peak search is carried out on the three-dimensional spatial spectrum $\mathcal{P}(\tilde{\theta},\tilde{\varphi})$ to obtain a direction-of-arrival estimation result. It specially comprises: a value of $\tilde{\varphi}$ is fixed at 0°, $\tilde{\theta}$ is gradually increased to 90° from −90° at an interval of 0.1°, then the $\tilde{\varphi}$ is increased to 0.1° from 0°, the $\tilde{\theta}$ is increased to 90° from −90° at an interval of 0.1° once again, and this process is repeated until the $\tilde{\varphi}$ is increased to 180°, a corresponding $\mathcal{P}(\tilde{\theta},\tilde{\varphi})$ is calculated in each two-dimensional direction-of-arrival of $(\tilde{\theta},\tilde{\varphi})$ so as to construct a three-dimensional spatial spectrum in a two-dimensional direction-of-arrival plane; peak values of the three-dimensional spatial spectrum $\mathcal{P}(\tilde{\theta},\tilde{\varphi})$ are searched in the two-dimensional direction-of-arrival plane, response values corresponding to these peak values are permutated in a descending order, and two-dimensional angle values corresponding to first K spectral peaks are taken as the direction-of-arrival estimation result of a corresponding signal source.

The effects of the present disclosure will be further described with conjunction of a simulation example.

In the simulation example, a three-dimensional co-prime cubic array is used to receive an incident signal, with selected parameters being $M_x^{(\mathbb{Q}_1)} = M_y^{(\mathbb{Q}_1)} = M_z^{(\mathbb{Q}_1)} = 2$, $M_x^{(\mathbb{Q}_2)} = M_y^{(\mathbb{Q}_2)} = M_z^{(\mathbb{Q}_2)} = 3$, i.e., the constructed three-dimensional co-prime cubic array comprises $M_x^{(\mathbb{Q}_1)} M_y^{(\mathbb{Q}_1)} M_z^{(\mathbb{Q}_1)} + M_x^{(\mathbb{Q}_2)} M_y^{(\mathbb{Q}_2)} M_z^{(\mathbb{Q}_2)} - 1 = 34$ physical array elements in total. Supposing there are two incident narrowband signals, azimuths and pitch angles in the incident direction are respectively [25°,20°] and [45°, 40°], and when SNR=0 dB, 800 sampling snapshots are adopted for a simulation experiment.

Figure 4:
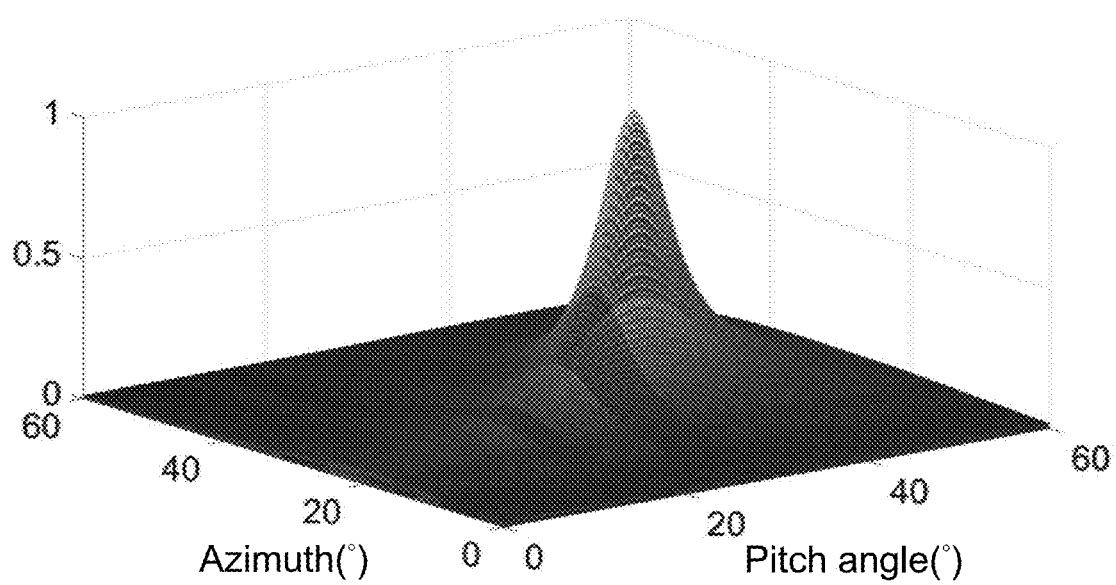
FIG. 4 is an effect diagram of direction-of-arrival estimation of a traditional method based on vectorized signal processing.
Figure 5:
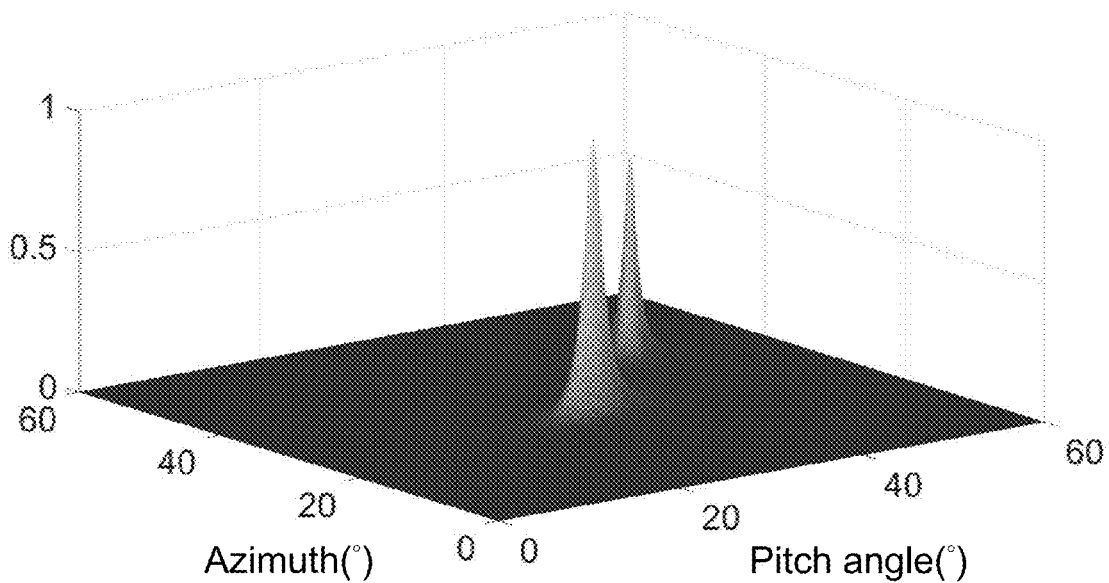
FIG. 5 is an effect diagram of direction-of-arrival estimation of a method put forward by the present disclosure.

An estimation result of a traditional three-dimensional co-prime cubic array direction-of-arrival estimation method based on vectorized signal processing is as shown in FIG. 4, wherein the x axis and the y axis represent a pitch angle and an azimuth of an incident signal source respectively. An estimation result of a three-dimensional co-prime cubic array direction-of-arrival estimation method based on a cross-correlation tensor provided by the present disclosure is as shown in FIG. 5. It is seen upon comparison that, the method of the present disclosure can preciously estimate the two incident signal sources, while the traditional method based on vectorized signal processing is unable to effectively identify the two incident signal sources, showing the advantages of the method of the present disclosure in direction-of-arrival estimation on resolution and performance.

In conclusion, in the present disclosure, relevance between a three-dimensional co-prime cubic array multi-dimensional virtual domain and cross-correlation tensor statistics is established, a virtual domain signal tensor is deduced by transformation of cross-correlation tensor statistics, and cross-correlation virtual domain tensor representation with a multi-dimensional space information structure retained is constructed; identifiability of a signal source is ensured by constructing a signal source identification mechanism for a virtual domain signal tensor without introducing a spatial smoothing step; and the Nyquist matched direction-of-arrival estimation is realized by means of virtual domain signal tensor decomposition.

The above merely shows preferred embodiments of the present disclosure. Although the present disclosure has been disclosed as above in the preferred embodiments, it is not used to limit thereto. Without departing from the scope of the technical solution of the present disclosure, any person skilled in the art can make many possible variations and modifications to the technical solution of the present disclosure by using the methods and technical contents disclosed above, or modify it into equivalent embodiments with equivalent changes. Therefore, any simple alteration, equivalent variation and modification of the above embodiments according to the technical essence of the present disclosure without departing from the technical solution of the invention still fall in the protection scope of the technical solution of the present disclosure.

The invention claimed is:

1. A three-dimensional co-prime cubic array direction-of-arrival estimation method based on a cross-correlation tensor, comprising the following steps:

(1) constructing at a receiving end with $M_x^{(\mathbb{Q}_1)} M_y^{(\mathbb{Q}_1)} M_z^{(\mathbb{Q}_1)} + M_x^{(\mathbb{Q}_2)} M_y^{(\mathbb{Q}_2)} M_z^{(\mathbb{Q}_2)} - 1$ physical antenna array elements in accordance with a structure of a three-dimensional co-prime cubic array, wherein $M_x^{(\mathbb{Q}_1)}$ and $M_x^{(\mathbb{Q}_2)}$, $M_y^{(\mathbb{Q}_1)}$ and $M_y^{(\mathbb{Q}_2)}$, and $M_z^{(\mathbb{Q}_1)}$ and $M_z^{(\mathbb{Q}_2)}$ are respectively a pair of co-prime integers, and the three-dimensional co-prime cubic array is decomposable into two sparse and uniform cubic subarrays $\mathbb{Q}_1$ and $\mathbb{Q}_2$;

(2) supposing there are K far-field narrowband non-coherent signal sources from a direction of $\{(\theta_1, \varphi_1), \ldots, (\theta_K, \varphi_K)\}$, carrying out modeling on a receiving signal of the sparse and uniform cubic subarray $\mathbb{Q}_i$ of the three-dimensional co-prime cubic array via a four-dimensional tensor $\mathcal{X}_{\mathbb{Q}_i} \in \mathbb{C}^{M_x^{(\mathbb{Q}_i)} \times M_y^{(\mathbb{Q}_i)} \times M_z^{(\mathbb{Q}_i)} \times T}$ (T is a number of sampling snapshots) as follows:

$$\mathcal{X}_{\mathbb{Q}_i} = \sum_{k=1}^{K} a_x^{(\mathbb{Q}_i)}(\mu_k) \circ a_y^{(\mathbb{Q}_i)}(\nu_k) \circ a_z^{(\mathbb{Q}_i)}(\omega_k) \circ s_k + \mathcal{N}_{\mathbb{Q}_i},$$

wherein, $s_k = [s_{k,1}, s_{k,2}, \ldots, s_{k,T}]^T$ is a multi-snapshot sampling signal waveform corresponding to a $k^{th}$ incident signal source, $(\cdot)^T$ represents a transposition operation, $\circ$ represents an external product of vectors, $\mathcal{N}_{\mathbb{Q}_i} \in \mathbb{C}^{M_x^{(\mathbb{Q}_i)} \times M_y^{(\mathbb{Q}_i)} \times M_z^{(\mathbb{Q}_i)} \times T}$ is a noise tensor mutually independent from each signal source, $a_x^{(\mathbb{Q}_i)}(\mu_k)$, $a_y^{(\mathbb{Q}_i)}(\nu_k)$ and $a_z^{(\mathbb{Q}_i)}(\omega_k)$ are steering vectors of the three-dimensional sparse and uniform cubic subarray $\mathbb{Q}_i$ in an x axis, a y axis and a z axis respectively, and a signal source corresponding to a direction-of-arrival of $(\theta_k, \varphi_k)$ is represented as:

$$a_x^{(\mathbb{Q}_i)}(\mu_k) = \left[1, e^{-j\pi x_{\mathbb{Q}_i}^{(2)} \mu_k}, \ldots, e^{-j\pi x_{\mathbb{Q}_i}^{(M_x^{(\mathbb{Q}_i)})} \mu_k}\right]^T,$$

$$a_y^{(\mathbb{Q}_i)}(\nu_k) = \left[1, e^{-j\pi y_{\mathbb{Q}_i}^{(2)} \nu_k}, \ldots, e^{-j\pi y_{\mathbb{Q}_i}^{(M_y^{(\mathbb{Q}_i)})} \nu_k}\right]^T,$$

$$a_z^{(\mathbb{Q}_i)}(\omega_k) = \left[1, e^{-j\pi z_{\mathbb{Q}_i}^{(2)} \omega_k}, \ldots, e^{-j\pi z_{\mathbb{Q}_i}^{(M_z^{(\mathbb{Q}_i)})} \omega_k}\right]^T,$$

wherein, $x_{\mathbb{Q}_i}^{(i_1)}$ ($i_1 = 1, 2, \ldots, M_x^{(\mathbb{Q}_i)}$), $y_{\mathbb{Q}_i}^{(i_2)}$ ($i_2 = 1, 2, \ldots, M_y^{(\mathbb{Q}_i)}$) and $z_{\mathbb{Q}_i}^{(i_3)}$ ($i_3 = 1, 2, \ldots, M_z^{(\mathbb{Q}_i)}$) respectively represent actual locations of $\mathbb{Q}_i$ in $i_1^{th}$, $i_2^{th}$, and $i_3^{th}$ physical antenna array elements in the x axis, the y axis and the z axis, and $x_{\mathbb{Q}_i}^{(1)} = y_{\mathbb{Q}_i}^{(1)} = z_{\mathbb{Q}_i}^{(1)} = 0$, $\mu_k = \sin(\varphi_k)\cos(\theta_k)$, $\nu_k = \sin(\varphi_k)\sin(\theta_k)$, $\omega_k = \cos(\varphi_k)$, $j = \sqrt{-1}$;

(3) based on four-dimensional receiving signal tensors $\mathcal{X}_{\mathbb{Q}_1}$ and $\mathcal{X}_{\mathbb{Q}_2}$ of the two three-dimensional sparse and uniform cubic subarrays $\mathbb{Q}_1$ and $\mathbb{Q}_2$, solving their cross-correlation statistics to obtain a six-dimensional space information-covered second-order cross-correlation tensor $\mathcal{R}_{\mathbb{Q}_1 \mathbb{Q}_2} \in \mathbb{C}^{M_x^{(\mathbb{Q}_1)} \times M_y^{(\mathbb{Q}_1)} \times M_z^{(\mathbb{Q}_1)} \times M_x^{(\mathbb{Q}_2)} \times M_y^{(\mathbb{Q}_2)} \times M_z^{(\mathbb{Q}_2)}}$:

$$\mathcal{R}_{\mathbb{Q}_1 \mathbb{Q}_2} = E[\langle \mathcal{X}_{\mathbb{Q}_1}, \mathcal{X}_{\mathbb{Q}_2}^* \rangle_4] = \sum_{k=1}^{K} \sigma_k^2 a_x^{(\mathbb{Q}_1)}(\mu_k) \circ a_y^{(\mathbb{Q}_1)}(\nu_k) \circ a_z^{(\mathbb{Q}_1)}(\omega_k) \circ a_x^{(\mathbb{Q}_2)*}(\mu_k) \circ a_y^{(\mathbb{Q}_2)*}(\nu_k) \circ a_z^{(\mathbb{Q}_2)*}(\omega_k) + \mathcal{N}_{\mathbb{Q}_1 \mathbb{Q}_2},$$

wherein, $\sigma_k^2 = E[s_k s_k^*]$ represents a power of a $k^{th}$ incident signal source, $\mathcal{N}_{\mathbb{Q}_1 \mathbb{Q}_2} = E[<\mathcal{N}_{\mathbb{Q}_1}, \mathcal{N}_{\mathbb{Q}_2}^*>_4]$ represents a six-dimensional cross-correlation noise tensor, $<\bullet,\bullet>_r$ represents a tensor contraction operation of two tensors along a $r^{th}$ dimension, $E[\bullet]$ represents an operation of taking a mathematic expectation, and $(\bullet)^*$ represents a conjugate operation; a six-dimensional tensor $\mathcal{N}_{\mathbb{Q}_1 \mathbb{Q}_2}$ merely has an element with a value of $\sigma_n^2$ in a $(1, 1, 1, 1, 1, 1)^{th}$ location, $\sigma_n^2$ representing a noise power, and with a value of 0 in other locations;

(4) as a first dimension and a fourth dimension of the cross-correlation tensor $\mathcal{R}_{\mathbb{Q}_1 \mathbb{Q}_2}$ represent space information in a direction of the x axis, a second dimension and a fifth dimension represent space information in a direction of the y axis, and a third dimension and a sixth dimension represent space information in a direction of the z axis, defining dimension sets $\mathbb{J}_1=\{1,4\}$, $\mathbb{J}_2=\{2,5\}$ and $\mathbb{J}_3=\{3,6\}$, and carrying out tensor transformation of dimension merging on the cross-correlation tensor $\mathcal{R}_{\mathbb{Q}_1 \mathbb{Q}_2}$ to obtain a virtual domain second-order equivalent signal tensor $\mathcal{U}_{\mathbb{W}} \in \mathbb{C}^{M_x^{(\mathbb{Q}_1)} M_x^{(\mathbb{Q}_2)} \times M_y^{(\mathbb{Q}_1)} M_y^{(\mathbb{Q}_2)} \times M_z^{(\mathbb{Q}_1)} M_z^{(\mathbb{Q}_2)}}$:

$$\mathcal{U}_{\mathbb{W}} \triangleq \mathcal{R}_{\mathbb{Q}_1 \mathbb{Q}_2 \{\mathbb{J}_1, \mathbb{J}_2, \mathbb{J}_3\}} = \sum_{k=1}^{K} \sigma_k^2 b_x(\mu_k) \circ b_y(\nu_k) \circ b_z(\omega_k),$$

wherein, $b_x(\mu_k) = a_x^{(\mathbb{Q}_2)*}(\mu_k) \otimes a_x^{(\mathbb{Q}_1)}(\mu_k)$, $b_y(\nu_k) = a_y^{(\mathbb{Q}_2)*}(\nu_k) \otimes a_y^{(\mathbb{Q}_1)}(\nu_k)$ and $b_z(\omega_k) = a_z^{(\mathbb{Q}_2)*}(\omega_k) \otimes a_z^{(\mathbb{Q}_1)}(\omega_k)$ respectively construct augmented virtual arrays in the directions of the x axis, the y axis and the z axis through forming arrays of difference sets on exponential terms, $b_x(\mu_k)$, $b_y(\nu_k)$ and $b_z(\omega_k)$ are respectively equivalent to steering vectors of the virtual arrays in the x axis, the y axis and the z axis to correspond to signal sources in a direction-of-arrival of $(\theta_k, \varphi_k)$, and $\otimes$ represents a product of Kronecker, so that $\mathcal{U}_{\mathbb{W}}$ corresponds to an augmented three-dimensional virtual non-uniform cubic array $\mathbb{W}$; $\mathbb{W}$ comprises a three-dimensional uniform cubic array $\overline{\mathbb{W}}$ with $(3M_x^{(\mathbb{Q}_1)} - M_x^{(\mathbb{Q}_2)} +1) \times (3M_y^{(\mathbb{Q}_1)} - M_y^{(\mathbb{Q}_2)} -1) \times M_z^{(\mathbb{Q}_1)} - M_z^{(\mathbb{Q}_2)} +1)$ virtual array elements, represented as: $\overline{\mathbb{W}} = \{(x,y,z) | x = p_x d, y = p_y d, z = p_z d, -M_x^{(\mathbb{Q}_1)} \leq p_x \leq -M_x^{(\mathbb{Q}_2)} +2M_x^{(\mathbb{Q}_1)}, -M_y^{(\mathbb{Q}_1)} \leq p_y \leq -M_y^{(\mathbb{Q}_2)} +2M_y^{(\mathbb{Q}_1)}, -M_z^{(\mathbb{Q}_1)} \leq p_z \leq -M_z^{(\mathbb{Q}_2)} +2M_z^{(\mathbb{Q}_1)}\}$, The equivalent signal tensor $\overline{\mathcal{U}}_{\overline{\mathbb{W}}} \in \mathbb{C}^{(3M_x^{(\mathbb{Q}_1)} - M_x^{(\mathbb{Q}_2)} +1) \times (3M_y^{(\mathbb{Q}_1)} - M_y^{(\mathbb{Q}_2)} +1) \times (3M_z^{(\mathbb{Q}_1)} - M_z^{(\mathbb{Q}_2)} +1)}$ of the three-dimensional uniform cubic array $\overline{\mathbb{W}}$ is modeled as: $\overline{\mathcal{U}}_{\overline{\mathbb{W}}} = \sum_{k=1}^{K} \sigma_k^2 \overline{b}_x(\mu_k) \circ \overline{b}_y(\nu_k) \circ \overline{b}_z(\omega_k)$, wherein, $$\overline{b}_x(\mu_k) = \left[ e^{-j\pi(-M_x^{(\mathbb{Q}_1)})\mu_k}, e^{-j\pi(-M_x^{(\mathbb{Q}_1)}+1)\mu_k}, \ldots, e^{-j\pi(-M_x^{(\mathbb{Q}_2)}+2M_x^{(\mathbb{Q}_1)})\mu_k} \right]^T \in \mathbb{C}^{3M_x^{(\mathbb{Q}_1)} - M_x^{(\mathbb{Q}_2)}+1},$$

$$\overline{b}_y(\nu_k) = \left[ e^{-j\pi(-M_y^{(\mathbb{Q}_1)})\nu_k}, e^{-j\pi(-M_y^{(\mathbb{Q}_1)}+1)\nu_k}, \ldots, e^{-j\pi(-M_y^{(\mathbb{Q}_2)}+2M_y^{(\mathbb{Q}_1)})\nu_k} \right]^T \in \mathbb{C}^{3M_y^{(\mathbb{Q}_1)} - M_y^{(\mathbb{Q}_2)}+1} \text{ and } \overline{b}_z(\omega_k) =$$

$$\left[ e^{-j\pi(-M_z^{(\mathbb{Q}_1)})\omega_k}, e^{-j\pi(-M_z^{(\mathbb{Q}_1)}+1)\omega_k}, \ldots, e^{-j\pi(-M_z^{(\mathbb{Q}_2)}+2M_z^{(\mathbb{Q}_1)})\omega_k} \right]^T \in \mathbb{C}^{3M_z^{(\mathbb{Q}_1)} - M_z^{(\mathbb{Q}_2)}+1}$$

represent steering vectors of the three-dimensional virtual uniform cubic array $\overline{\mathbb{W}}$ in the x axis, the y axis and the z axis corresponding to signal sources in the direction-of-arrival of $(\theta_k, \varphi_k)$;

(5) as a mirror image portion $\overline{\mathbb{W}}_{sym}$ of the three-dimensional virtual uniform cubic array $\overline{\mathbb{W}}$ is represented as:

$$\overline{\mathbb{W}}_{sym} = \{(x,y,z) | x = \tilde{p}_x d, y = \tilde{p}_y d, z = \tilde{p}_z d, M_x^{(\mathbb{Q}_2)} -2$$
$$M_x^{(\mathbb{Q}_1)} \leq \tilde{p}_x \leq M_x^{(\mathbb{Q}_1)}, M_y^{(\mathbb{Q}_2)} -2M_y^{(\mathbb{Q}_1)} \leq \tilde{p}_y \leq M_y^{(\mathbb{Q}_1)},$$
$$M_z^{(\mathbb{Q}_2)} -2M_z^{(\mathbb{Q}_1)} \leq \tilde{p}_z \leq M_z^{(\mathbb{Q}_1)} \},$$

carrying out transformation by using the equivalent signal tensor $\overline{\mathcal{U}}_{\overline{\mathbb{W}}}$ of the three-dimensional virtual uniform cubic array $\overline{\mathbb{W}}$ to obtain an equivalent signal tensor $\overline{\mathcal{U}}_{\overline{\mathbb{W}} sym} \in \mathbb{C}^{(3M_x^{(\mathbb{Q}_1)} - M_x^{(\mathbb{Q}_2)} +1) \times (3M_y^{(\mathbb{Q}_1)} - M_y^{(\mathbb{Q}_2)} +1) \times (3M_z^{(\mathbb{Q}_1)} - M_z^{(\mathbb{Q}_2)} +1)}$ of a three-dimensional mirror image virtual uniform cubic array $\overline{\mathbb{W}}_{sym}$, specifically comprising: carrying out a conjugate operation on the three-dimensional virtual domain signal tensor $\overline{\mathcal{U}}_{\overline{\mathbb{W}}}$ to obtain $\overline{\mathcal{U}}_{\overline{\mathbb{W}}}^*$, carrying out position reversal on elements in the $\overline{\mathcal{U}}_{\overline{\mathbb{W}}}^*$ along directions of three dimensions successively so as to obtain the equivalent signal tensor $\overline{\mathcal{U}}_{\overline{\mathbb{W}} sym}$ corresponding to the $\overline{\mathbb{W}}_{sym}$; superposing the equivalent signal tensor $\overline{\mathcal{U}}_{\overline{\mathbb{W}}}$ of the three-dimensional virtual uniform cubic array $\overline{\mathbb{W}}$ and the equivalent signal tensor $\overline{\mathcal{U}}_{\overline{\mathbb{W}} sym}$ of the mirror image virtual uniform cubic array $\overline{\mathbb{W}}_{sym}$ in the fourth dimension to obtain a four-dimensional virtual domain signal tensor $\mathcal{G} \in \mathbb{C}^{(3M_x^{(\mathbb{Q}_1)} - M_x^{(\mathbb{Q}_2)} +1) \times (3M_y^{(\mathbb{Q}_1)} - M_y^{(\mathbb{Q}_2)} +1) \times (3M_z^{(\mathbb{Q}_1)} - M_z^{(\mathbb{Q}_2)} +1) \times 2}$, modeled as: $\mathcal{G} = \sum_{k=1}^{K} \sigma_k^2 \overline{b}_x(\mu_k) \circ \overline{b}_y(\nu_k) \circ \overline{b}_z(\omega_k) \circ c(\mu_k, \nu_k, \omega_k)$, wherein, $$c(\mu_k, \nu_k, \omega_k) = \left[ 1, e^{-j\pi\left((M_x^{(\mathbb{Q}_2)} - M_x^{(\mathbb{Q}_1)})\mu_k + (M_y^{(\mathbb{Q}_2)} - M_y^{(\mathbb{Q}_1)})\nu_k + (M_z^{(\mathbb{Q}_2)} - M_z^{(\mathbb{Q}_1)})\omega_k\right)} \right]^T$$

is a three-dimensional space mirror image transformation factor vector;

(6) carrying out CANDECOMP/PARACFAC decomposition on the four-dimensional virtual domain signal tensor $\mathcal{G}$ to obtain factor vectors $\overline{b}_x(\mu_k), \overline{b}_y(\nu_k), \overline{b}_z(\omega_k)$ and $c(\mu_k, \nu_k, \omega_k)$, $k=1,2,\ldots,K$, corresponding to four-dimensional space information, and constructing a signal subspace $V_s \in \mathbb{C}^{V \times K}$ through a form of their Kronecker products: $V_s = \text{orth}([\overline{b}_x(\mu_1) \otimes \overline{b}_y(\nu_1) \otimes \overline{b}_z(\omega_1) \otimes c(\mu_1, \nu_1, \omega_1), \overline{b}_x(\mu_2) \otimes \overline{b}_y(\nu_2) \otimes \overline{b}_z(\omega_2) \otimes c(\mu_2, \nu_2, \omega_2), \ldots, \overline{b}_x(\mu_K) \otimes \overline{b}_y(\nu_K) \otimes \overline{b}_z(\omega_K) \otimes c(\mu_K, \nu_K, \omega_K)])$, wherein, $\text{orth}(\bullet)$ represents a matrix orthogonalization operation, $V = 2(3M_x^{(\mathbb{Q}_1)} - M_x^{(\mathbb{Q}_2)} +1)(3M_y^{(\mathbb{Q}_1)} - M_y^{(\mathbb{Q}_2)} +1)(3M_z^{(\mathbb{Q}_1)} - M_z^{(\mathbb{Q}_2)} +1)$; by using $V_n \in \mathbb{C}^{V \times (V-K)}$ to represent a noise subspace, $V_n V_n^H$ is obtained by $V_s$:

$$V_n V_n^H = I - V_s V_s^H,$$

wherein, I represents a unit matrix; $(\bullet)^H$ represents a conjugate transposition operation; and (7) traversing a two-dimensional direction-of-arrival of $(\tilde{\theta}, \tilde{\varphi})$, calculating corresponding parameters $\tilde{\mu}_k = \sin(\tilde{\theta}_k)$, $\tilde{\nu}_k = \sin(\tilde{\varphi}_k)\sin(\tilde{\theta}_k)$ and $\tilde{\omega}_k = \cos(\tilde{\varphi}_k)$, and constructing a steering vector $\tilde{v}(\tilde{\mu}_k, \tilde{\nu}_k, \tilde{\omega}_k) \in \mathbb{C}^V$ corresponding to the three-dimensional virtual uniform cubic array $\overline{\mathbb{W}}$, represented as: $\tilde{\boldsymbol{v}}(\tilde{\mu}_k,\tilde{v}_k,\tilde{\omega}_k)=\overline{b}_x(\tilde{\mu}_k)\otimes\overline{b}_y(\tilde{v}_k)\otimes\overline{b}_z(\tilde{\omega}_k)\otimes c(\tilde{\mu}_k,\tilde{v}_k,\tilde{\omega}_k)$, wherein, $\tilde{\theta}\in[-90°,\pi°]$, $\tilde{\varphi}\in[0°,180°]$, A three-dimensional spatial spectrum $\mathcal{P}(\tilde{\theta},\tilde{\varphi})$ is calculated as follows:

$$\mathcal{P}(\tilde{\theta},\tilde{\varphi})=1/(\tilde{\boldsymbol{v}}^H(\tilde{\mu}_k,\tilde{v}_k,\tilde{\omega}_k)(V_nV_n^H)\tilde{\boldsymbol{v}}(\tilde{\mu}_k,\tilde{v}_k,\tilde{\omega}_k)),$$

Spectral peak search is carried out on the three-dimensional spatial spectrum $\mathcal{P}(\tilde{\theta},\tilde{\varphi})$ to obtain a direction-of-arrival estimation result.

2. The three-dimensional co-prime cubic array direction-of-arrival estimation method based on a cross-correlation tensor according to claim 1, wherein the structure of the three-dimensional co-prime cubic array in step (1) is described as: a pair of three-dimensional sparse and uniform cubic subarrays $\mathbb{Q}_1$ and $\mathbb{Q}_2$ are constructed in a rectangular coordinate system, wherein $\mathbb{Q}_1$ comprises $M_x^{(\mathbb{Q}_1)} \times M_y^{(\mathbb{Q}_1)} \times M_z^{(\mathbb{Q}_1)}$ antenna array elements, with array element spacings in the directions of the x axis, the y axis and the z axis being $M_x^{(\mathbb{Q}_2)}$ d, $M_y^{(\mathbb{Q}_2)}$ d and $M_z^{(\mathbb{Q}_2)}$ d respectively, with locations in the rectangular coordinate system being $\{(M_x^{(\mathbb{Q}_2)} dm_{1x}, M_y^{(\mathbb{Q}_2)} dm_{1y}, M_z^{(\mathbb{Q}_2)} dm_{1z}), m_{1x}=0,1,\ldots, M_x^{(\mathbb{Q}_1)}-1, m_{1y}=0,1,\ldots, M_y^{(\mathbb{Q}_1)}-1, m_{1z}=0,1,\ldots, M_z^{(\mathbb{Q}_1)}-1\}$; $\mathbb{Q}_2$ comprises $M_x^{(\mathbb{Q}_2)} \times M_y^{(\mathbb{Q}_2)} \times M_z^{(\mathbb{Q}_2)}$ antenna array elements, with array element spacings in the directions of the x axis, the y axis and the z axis being $M_x^{(\mathbb{Q}_1)}$ d, $M_y^{(\mathbb{Q}_1)}$ d and $M_z^{(\mathbb{Q}_1)}$ d respectively, with locations in the rectangular coordinate system being $\{(M_x^{(\mathbb{Q}_1)} dm_{2x}, M_y^{(\mathbb{Q}_1)} dm_{2y}, M_z^{(\mathbb{Q}_1)} dm_{2z}), m_{2x}=0,1,\ldots, M_x^{(\mathbb{Q}_2)}-1, m_{2y}=0,1,\ldots, M_y^{(\mathbb{Q}_2)}-1, m_{2z}=0, 1,\ldots, M_z^{(\mathbb{Q}_2)}-1\}$; a unit spacing d has a value half of an incident narrowband signal wavelength) $\lambda$, i.e., $d=\lambda/2$; subarray combination is carried out on the $\mathbb{Q}_1$ and $\mathbb{Q}_2$ in such a way that array elements on the (0, 0, 0) location in the rectangular coordinate system are overlapped so as to obtain a three-dimensional co-prime cubic array actually containing $M_x^{(\mathbb{Q}_1)} M_y^{(\mathbb{Q}_1)} M_z^{(\mathbb{Q}_1)} + M_x^{(\mathbb{Q}_2)} M_y^{(\mathbb{Q}_2)} M_z^{(\mathbb{Q}_2)} -1$ physical antenna array elements.

3. The three-dimensional co-prime cubic array direction-of-arrival estimation method based on a cross-correlation tensor according to claim 1, wherein the second-order cross-correlation tensor statistics of the three-dimensional co-prime cubic array in step (3) are estimated by calculating cross-correlation statistics of T sampling snapshots of the receiving signal tensors $\mathcal{X}_{\mathbb{Q}_1}(t)$ and $\mathcal{X}_{\mathbb{Q}_2}(t)$ in reality:

$$\mathcal{R}_{\mathbb{Q}_1\mathbb{Q}_2} = \frac{1}{T}\sum_{t=1}^{T} \mathcal{X}_{\mathbb{Q}_1}(t)\circ\mathcal{X}_{\mathbb{Q}_2}^*(t).$$

4. The three-dimensional co-prime cubic array direction-of-arrival estimation method based on a cross-correlation tensor according to claim 1, wherein the equivalent signal tensor $\overline{\mathcal{U}}_{\overline{\mathbb{W}}}$ of the three-dimensional virtual uniform cubic array $\overline{\mathbb{W}}$ in step (4) can be obtained by selecting elements in the equivalent signal tensor $\mathcal{U}_{\mathbb{W}}$ of the three-dimensional virtual nonuniform cubic array $\mathbb{W}$ corresponding to locations of virtual array elements in the $\overline{\mathbb{W}}$.

5. The three-dimensional co-prime cubic array direction-of-arrival estimation method based on a cross-correlation tensor according to claim 1, wherein in step (6), CANDECOMP/PARAFAC decomposition is carried out on the four-dimensional virtual domain signal tensor $\mathcal{G}$ to obtain factor matrixes $\overline{B}_x=[\overline{b}_x(\mu_1), \overline{b}_x(\mu_2), \ldots \overline{b}_x(\mu_K)]$, $\overline{B}_y=[\overline{b}_y(v_1), \overline{b}_y(v_2), \ldots, \overline{b}_y(v_K)]$, $\overline{B}_z=[\overline{b}_z(\omega_1), \overline{b}_z(\omega_2), \ldots, \overline{b}_z(\omega_K)]$ and $C=[c(\mu_1,v_1,\omega_1), c(\mu_2,v_2,\omega_2), \ldots, c(\mu_K,v_K,\omega_K)]$, wherein, CANDECOMP/PARAFAC decomposition of the four-dimensional virtual domain signal tensor $\mathcal{G}$ follows a uniqueness condition as follows: $k_{rank}(\overline{B}_x)+k_{rank}(\overline{B}_y)+k_{rank}(\overline{B}_z)+k_{rank}(C)\geq 2K+3$, wherein, $k_{rank}(\cdot)$ represents a Kruskal rank of a matrix, and $k_{rank}(\overline{B}_x)=\min(3 M_x^{(\mathbb{Q}_1)}-M_x^{(\mathbb{Q}_2)}+1, K)$, $k_{rank}(\overline{B}_y)=\min(3 M_y^{(\mathbb{Q}_1)}-M_y^{(\mathbb{Q}_2)}-1, K)$, $k_{rank}(\overline{B}_z)=\min(3 M_z^{(\mathbb{Q}_1)}-M_z^{(\mathbb{Q}_2)}+1, K)$, $k_{rank}(C)=\min(2, K)$, $\min(\cdot)$ represents an operation of taking a minimum value; when spatial smoothing is not introduced to process the deduced four-dimensional virtual domain signal tensor $\mathcal{G}$, a uniqueness inequation of the above CANDECOMP/PARACFAC decomposition is established.

6. The three-dimensional co-prime cubic array direction-of-arrival estimation method based on a cross-correlation tensor according to claim 1, wherein in step (7), a process of obtaining a direction-of-arrival estimation result by three-dimensional spatial spectrum search specifically comprises: fixing a value of $\tilde{\varphi}$ at $0°$, gradually increasing $\tilde{\theta}$ to $90°$ from $-90°$ at an interval of $0.1°$, increasing the $\tilde{\theta}$ to $0.1°$ from $0°$, increasing the $\tilde{\theta}$ to $90°$ from $-90°$ at an interval of $0.1°$ once again, and repeating this process until the $\tilde{\varphi}$ is increased to $180°$, calculating a corresponding $\mathcal{P}(\tilde{\theta},\tilde{\varphi})$ in each two-dimensional direction-of-arrival of $(\tilde{\theta},\tilde{\varphi})$ so as to construct a three-dimensional spatial spectrum on a two-dimensional direction-of-arrival plane; searching peak values of the three-dimensional spatial spectrum $\mathcal{P}(\tilde{\theta},\tilde{\varphi})$ in the two-dimensional direction-of-arrival plane, permutating response values corresponding to these peak values in a descending order, and taking two-dimensional angle values corresponding to first K spectral peaks as the direction-of-arrival estimation result of a corresponding signal source.

\* \* \* \* \*